(12) United States Patent
Hiraki et al.

(10) Patent No.: US 7,416,503 B2
(45) Date of Patent: Aug. 26, 2008

(54) SPEED-CHANGING DEVICE

(75) Inventors: Hikosaburo Hiraki, Oyama (JP);
Takashi Kuse, Komatsu (JP); Toshikazu Okada, Osaka (JP); Shigeru Yamamoto, Hirakata (JP); Naoki Ishizaki, Kawachigun (JP)

(73) Assignee: Komatsu Ltd., Tokyo (JP)

( * ) Notice: Subject to any disclaimer, the term of this patent is extended or adjusted under 35 U.S.C. 154(b) by 273 days.

(21) Appl. No.: 10/556,843

(22) PCT Filed: Apr. 30, 2004

(86) PCT No.: PCT/JP2004/006400

§ 371 (c)(1),
(2), (4) Date: Nov. 16, 2005

(87) PCT Pub. No.: WO2004/104449

PCT Pub. Date: Dec. 2, 2004

(65) Prior Publication Data

US 2006/0217225 A1 Sep. 28, 2006

(30) Foreign Application Priority Data

May 21, 2003 (JP) ............................. 2003-143684

(51) Int. Cl.
*F16H 47/04* (2006.01)
(52) U.S. Cl. ................................ 475/73; 475/78; 475/83
(58) Field of Classification Search ................... 475/72, 475/7, 76, 78, 83
See application file for complete search history.

(56) References Cited

U.S. PATENT DOCUMENTS

| | | | |
|---|---|---|---|
| 3,869,939 A | 3/1975 | Miyao et al. | |
| 3,888,139 A | 6/1975 | Orshansky, Jr. | |
| 3,982,448 A | 9/1976 | Polak et al. | |
| 3,988,949 A | 11/1976 | Weseloh et al. | |
| 4,313,351 A | 2/1982 | Hagin | |
| 4,471,668 A * | 9/1984 | Elsner | 475/72 |
| 4,825,722 A | 5/1989 | Hagin et al. | |
| 4,976,664 A | 12/1990 | Hagin et al. | |
| 5,890,981 A | 4/1999 | Coutant et al. | |
| 6,478,705 B1 | 11/2002 | Holmes et al. | |
| 7,121,970 B2 * | 10/2006 | Funato et al. | 475/78 |
| 7,195,580 B2 * | 3/2007 | Funato et al. | 477/110 |
| 2003/0008745 A1 | 1/2003 | Heindl | |

FOREIGN PATENT DOCUMENTS

DE 2141098 2/1973

(Continued)

OTHER PUBLICATIONS

English translation of DE2141098, http://www.worldling.com/wl/epo/epo.html, Dec. 6, 2007.*

(Continued)

*Primary Examiner*—Roger Pang
(74) *Attorney, Agent, or Firm*—Frishauf, Holtz, Goodman & Chick, P.C.

(57) ABSTRACT

A transmission is provided which has a very compact system configuration and is capable of exerting high energy efficiency over all speed regions from a low speed region to a high speed region, while providing improved operability free from a torque shortage. To this end, the transmission has an input shaft 3, an intermediate output shaft 8, a planetary gear mechanism 9, a first pump-motor 7, and a second pump-motor 15 connected to the first pump-motor 7, the input shaft 3 being coupled to a first element (planetary carrier 12) of the planetary gear mechanism 9, the second pump-motor 15 being coupled to a second element (sun gear 19) of the planetary gear mechanism 9, the intermediate output shaft 8 being coupled to a third element (ring gear 16) of the planetary gear mechanism 9, and the transmission further comprising a switching mechanism (synchromesh mechanism 6) for selectively coupling the first pump-motor 7 to either the input shaft 3 or the intermediate output shaft 8.

8 Claims, 20 Drawing Sheets

FOREIGN PATENT DOCUMENTS

| | | |
|---|---|---|
| DE | 33 03 448 A1 | 8/1983 |
| DE | 3438561 A1 | 4/1986 |
| DE | 3733152 A1 | 4/1989 |
| DE | 4140979 A1 * | 6/1993 ................. 475/72 |
| DE | 4200692 A1 * | 7/1996 ................. 475/72 |
| DE | 197 47 459 A1 | 5/1999 |
| EP | 26115 A2 | 4/1981 |
| EP | 0 234 135 A1 | 9/1987 |
| GB | 2222212 A | 2/1990 |
| GB | 2 377 260 A | 1/2003 |
| JP | 50-136571 A | 10/1973 |
| JP | 48-85959 A | 11/1973 |
| JP | 49-3060 | 1/1974 |
| JP | 49-14934 | 4/1974 |
| JP | 49-56068 A | 5/1974 |
| JP | 50-85019 A | 7/1975 |
| JP | 50-136571 A | 10/1975 |
| JP | 51-140068 | 12/1976 |
| JP | 10-159939 A | 6/1998 |
| JP | 11-051149 A | 2/1999 |
| JP | 11-321357 A | 11/1999 |
| JP | 2001-200900 A | 7/2001 |
| JP | 2001-208004 A | 8/2001 |
| JP | 2001-336602 A | 12/2001 |
| JP | 2003-164007 A | 6/2003 |
| JP | 2005-127485 A | 5/2005 |

OTHER PUBLICATIONS

U.S. Appl. No. 11/662,327, filed Mar. 8, 2007, Inventor: H. Hiraki et al., entitled TRANSMISSION.

Tomoo Ishihara et al; Design of Hydraulic Power Transmission; Nov. 30, 1967; pp. 191-198.

English translation of German Office Action issued for corresponding German Patent Application No. 11 2004 000 874.3-12 dated Jul. 25, 2007, 4 pages.

GB Office Action Dated Aug. 8, 2006 Issued in Counterpart GB Application No. 0612716.1.

U.S. Appl. No. 11/920,823, filed Nov. 20, 2007, Inventor: H. Hiraki et al, entitled Transmission System.

* cited by examiner 18 (a)

18 (b)

19 (a)

19 (b)

20 (a)

20 (b)

US 7,416,503 B2

SPEED-CHANGING DEVICE

This application is a U.S. National Phase Application under 35 U.S.C 371 of International Application PCT/JP2004/006400 filed Apr. 30, 2004.

TECHNICAL FIELD

The present invention relates to a hydraulic-mechanical or electro-mechanical transmission having a planetary gear mechanism in combination with pump-motors or generator-motors.

BACKGROUND ART

There are conventionally known, as hydraulic transmissions, (i) pure hydraulic transmissions (e.g., hydrostatic transmissions (HST)) which convert all input power supplied from an engine into oil pressure and transmit it and (ii) hydro-mechanical (power-split type) transmissions (HMT) which hydraulically transmit part of input power while mechanically transmitting the remaining part. The latter transmissions (HMT) have the advantage of achieving higher efficiency than the former transmissions (HST) since they convert only part of mechanical power into hydraulic power and the transmission efficiency of mechanical power is high. For this reason, the hydro-mechanical transmissions are said to be ideal transmissions for vehicles subjected to significant load fluctuations such as bulldozers and wheel loaders and therefore some of them are, in fact, employed in such vehicles.

A typical hydro-mechanical transmission (HMT) attains variable speed characteristics by a planetary gear mechanism. Of the three elements (i.e., a sun gear, a carrier equipped with a planetary gear, and a ring gear) of the planetary gear mechanism, the first element and the second element are coupled to the input shaft and the output shaft respectively, while the third element is coupled to the hydraulic pump or hydraulic motor. The rotating speed of the hydraulic pump or hydraulic motor is varied, thereby changing the rotating speed of the output shaft.

The above HMT is classified into two types. One is known as "the output split type" in which the hydraulic pump or hydraulic motor coupled to the planetary gear mechanism is connected by a hydraulic circuit to another hydraulic pump or hydraulic motor which is in turn coupled to the input shaft of the transmission so as to have a constant speed ratio. The other is known as "the input split type" in which the hydraulic pump or hydraulic motor coupled to the planetary gear mechanism is connected by a hydraulic circuit to another hydraulic pump or hydraulic motor which is in turn coupled to the output shaft of the transmission so as to have a constant speed ratio. Further, the output-split type and input-split type are respectively classified into six types according to which of the three elements of the planetary gear mechanism is coupled to the hydraulic pump/motor, the input shaft or the output shaft so that 12 types are available in total as basic combinations.

One prior art technique associated with the invention is disclosed in Japanese Published Unexamined Patent Application No. 2001-200900. The transmission disclosed in this publication includes a hydraulic transmission and a mechanical transmission having a planetary gear mechanism. The hydraulic transmission is driven by the mechanical transmission so that they interact with each other, operating with high efficiency over a wide range of operating conditions.

Next, reference is made to FIG. 18 (a) to describe a conventional output-split type transmission (HMT) having two pump-motors (which serve as a pump and a motor). In the transmission 100, a first gear 103 is fixed to an input shaft 102 to which motive power from an engine 101 is input, and a second gear 104 in mesh with the first gear 103 is fixed to a shaft 105a of a first pump-motor 105. Fixed to an input shaft 102 is a sun gear 107 of a planetary gear mechanism 106. A plurality of planetary gears 108 mesh with the outer circumference of the sun gear 107. Each planetary gear 108 is borne by a planetary carrier 109 to which an output shaft 110 is fixed. A ring gear 111 meshes with the outer circumference of the planetary gear set 108. A third gear 112 meshes with the outer circumference of the ring gear 111 and is fixed to a shaft 113a of a second pump-motor 113. Herein, the first pump-motor 105 and the second pump-motor 113 are hydraulically connected to each other through a piping 114.

In such an arrangement, when the rotating speed of the second pump-motor 113, in other words, the rotating speed of the ring gear 111 is zero, the motive power transmitted by the medium of oil pressure is zero so that all motive power is transmitted through the mechanical mechanism.

On the basis of the rotating speed of the output shaft 110 at that time, the operation of this transmission will be described.

(1) When increasing the speed of the output shaft 110, the second pump-motor 113 receives motive power through the medium of oil pressure and is driven so as to increase the speed of the output shaft 110. At that time, the first pump-motor 105 acts as a pump while the second pump-motor 113 acting as a motor, so that energy flows from the first pump-motor 105 toward the second pump-motor 113 through the medium of oil pressure. At that time, the horse power transmitted by the hydraulic power becomes plus (+) as indicated by line A-B of FIG. 18(b), so that hydraulic power is transmitted, in a forward direction, i.e., from the input shaft 102 toward the planetary gear mechanism 106.

(2) When reducing the speed of the output shaft 110, the second pump-motor 113 receives motive power from the planetary gear mechanism 106, rotating in a direction opposite to the case (1). At that time, the second pump-motor 113 acts as a pump while the first pump-motor 105 acting as a motor, so that energy flows from the second pump-motor 113 toward the first pump-motor 105 through the medium of oil pressure. At that time, the horse power transmitted by the hydraulic power becomes minus (−) as indicated by line A-C of FIG. 18(b), so that hydraulic power is transmitted in a reverse direction, i.e., from the planetary gear mechanism 106 toward the input shaft 102.

In the input split type HMT (transmission 200) shown in FIG. 19(a), the planetary gear mechanism 106 is disposed on the side of the input shaft 102 whereas the first pump-motor 105 is on the side of the output shaft 110. In FIG. 19(a), those parts that are identical with or correspond to those of the transmission 100 shown in FIG. 18(a) are identified by the same reference numerals as of FIG. 18(a) and a detailed explanation of them is omitted.

The input split type transmission 200 operates as follows.

(1) When increasing the speed of the output shaft 110, the second pump-motor 113 acts as a motor while the first pump-motor 105 acting as a pump, so that energy flows from the first pump-motor 105 toward the second pump-motor 113 through the medium of oil pressure. At that time, the horse power transmitted by the hydraulic power becomes minus (−) as indicated by line A-D of FIG. 19(b), so that hydraulic power is transmitted in a reverse direction i.e., from the output shaft 110 toward the planetary gear mechanism 106.

(2) When reducing the speed of the output shaft 110, the second pump-motor 113 receives motive power from the planetary gear mechanism 106, rotating in a direction opposite to the case (1). At that time, the second pump-motor 113 acts as a pump while the first pump-motor 105 acting as a motor, so that energy flows from the second pump-motor 113 toward the first pump-motor 105 through medium of oil pressure. At that time, the horse power transmitted by the hydraulic power becomes plus (+) as indicated by line A-E of FIG. 19(*b*), so that hydraulic power is transmitted in a forward direction, i.e., from the planetary gear mechanism 106 toward the output shaft 110.

As such, in both the output split type and input split type transmissions, a forward energy flow and a reverse energy flow occur in the speed-up side and the speed-down side. The transmission efficiency of energy of this case will be examined below taking the output split type transmission 100 shown in FIG. 18 for example. Herein, the transmission efficiency of the mechanical unit is 95% and the transmission efficiency of the hydraulic unit is 80% (Generally, where a pump-motor is used, transmission efficiency is low). For easy comparison, a case where the output rotating speed of the hydraulic unit is increased by 0.5 to 1.5 when the output rotating speed of the mechanical unit is 1 is compared to a case where the output rotating speed of the hydraulic unit is reduced by 0.5 to 0.5 when the output rotating speed of the mechanical unit is 1.

FIG. 20(*a*) shows the case where hydraulic power flows in the forward direction. One-third (=0.5/1.5=0.333) the energy (1.0) output from the engine 101 flows to the hydraulic unit for increasing speed. Transmitted to the output shaft 110 are 0.633 (=0.667×0.95) part of energy from the mechanical unit and 0.267 (=0.333×0.8) part of energy from the hydrostatic unit. As a result, the overall efficiency becomes 0.9 (=0.633+0.267). The case where hydraulic power flows in the reverse direction is shown in FIG. 20 (*b*). Where the energy transmitted from the mechanical unit to the hydraulic unit for reducing speed is represented by E, the energy at the output side of the mechanical unit before splitting is 2E and the following equation is obtained.

$$((1+0.8E) \times 0.95) = 2E \quad \text{(Equation 1)}$$

From Equation 1, E=0.766 is obtained so that the overall efficiency is 0.766.

As just discussed, when hydraulic power flows in the reverse direction, a flow of large energy occurs in each element, causing poor efficiency. In other words, the forward flow of hydraulic energy is better than the reverse flow of hydraulic energy. As apparent from FIGS. 20(*a*) and 20(*b*), if part of energy is directed in the reverse direction, the energy that passes through the mechanical unit will increase. This entails a need for a larger planetary gear mechanism, which is disadvantageous in economical efficiency.

The previous technique relating to the invention, which is disclosed in Japanese Published Unexamined Patent Application No. 2001-200900, is designed to avoid the above-described situation in which energy flows in the reverse direction, by properly changing the transmission path which extends between the planetary gear mechanism and the output shaft. The technique disclosed in this publication, however, is complicated in the structure of the planetary gear mechanism and inevitably involves a multiplicity of gears which do not participate in energy transmission, increasing idling losses with the result that the transmission efficiency of the mechanical unit deteriorates. Furthermore, the technique disclosed in this publication has revealed such a drawback that since it is designed to shift gears by switching the transmission path between the planetary gear mechanism and the output shaft through engagement/disengagement of clutches, a so-called torque shortage (i.e., a momentary drop in the torque of the output shaft) or a gear change shock will occur if the timing of clutch engagement/disengagement is bad.

The invention is directed to overcoming the foregoing problems and a primary object of the invention is therefore to provide a transmission having a very compact system configuration and capable of increasing energy efficiency over all speed regions from a low speed region to a high speed region, while providing improved operability free from a torque shortage.

DISCLOSURE OF THE INVENTION

In accomplishing the above object, there has been provided, in accordance with a first aspect of the invention, a transmission comprising an input shaft, an output shaft, a planetary gear mechanism interposed between the input shaft and the output shaft, a first pump-motor, and a second pump-motor connected to the first pump-motor, the input shaft being coupled to a first element of the planetary gear mechanism, the second pump-motor being coupled to a second element of the planetary gear mechanism, and the output shaft being coupled to a third element of the planetary gear mechanism, the transmission further comprising:

a switching mechanism for selectively coupling the first pump-motor to either the input shaft or the output shaft.

According to the invention, for increasing the speed of the output shaft, the switching mechanism performs switching so as to couple the first pump-motor to the input shaft side, thereby obtaining the function of an output split type transmission. For reducing the speed of the output shaft, the switching mechanism performs switching so as to couple the first pump-motor to the output shaft side, thereby obtaining the function of an input split type transmission. As a result, the horse power transmitted by the hydraulic power can be kept to a positive value irrespective of the rotating speed of the output shaft, and the hydraulic power can be allowed to constantly flow in the forward direction. The transmission of the invention has good power efficiency, compared to the conventional input split type and output split type transmissions, because it is free from increases in the loss of horse power caused by a flow of power in the reverse direction. In addition, it does not suffer from a torque shortage and therefore ensure good operability. Further, the planetary gear mechanism is of the single planetary gear type and therefore can be constructed in a very simple structure. Another advantage is such that since the hydraulic power constantly flows in the forward direction, the design strength of the planetary gear mechanism can be reduced which contributes to a reduction in the size of the whole system as well as costs.

Preferably, the transmission of the invention further comprises outflow preventing means for preventing an outflow of pressure oil from the second pump-motor during switching operation performed by the switching mechanism (i.e., while the rotation of the second pump-motor is stopped). This inhibits a rise of oil pressure between the first pump-motor and the second pump-motor during the switching operation, whereby a leakage of pressure oil from the first pump-motor can be prevented while the rotation of the second pump-motor is stopped and as a result, a decrease in efficiency can be prevented without fail.

It is preferable that at least either the first pump-motor or the second pump-motor is constituted by a plurality of pump-motors. With this arrangement, only one pump-motor can be driven during an operation which requires small capacity just after switching from a direct mode for transmitting power only by the mechanical unit to a hydraulic mechanical transmission mode (HMT mode) for transmitting power by both the hydraulic unit and the mechanical unit. And, after switching to an operation which requires high capacity, two pump-motors are brought into operation. This leads to further increased efficiency.

In this case, at least one of the plurality of pump-motors which constitute the first or second pump motor is connected to the planetary gear mechanism with a speed reduction ratio different from those of other pump-motors. Thereby, the speed range covered by each pump-motor can be varied, which can reduce the capacity of the pump-motors.

Preferably, some of the plurality of pump-motors which constitute the first or second pump motor are each replaced with a generator-motor and, under a predetermined condition, motive power is transmitted by electric-mechanical transmission instead of hydraulic-mechanical transmission. Thereby, further improved efficiency can be achieved by making effective use of the merits of a low-cost hydraulic power transmission system having high power density and an electric power transmission system having good efficiency.

In each of the above inventions, it is preferable to use a unidirectional rotation type pump-motor as the first pump-motor and to use a selector valve for switching a flow of pressure oil toward the unidirectional rotation type pump-motor so as to be constantly directed in a specified direction. The effective use of the inexpensive unidirectional rotation type pump-motor leads to a reduction in the cost of the whole system.

In the invention, it is preferable to provide controlling means for controlling the switching mechanism so as to establish, at the time of switching operation performed by the switching mechanism, a vehicle speed region which brings the rotation of the second pump-motor to a stop. Thereby, all energy passes through the mechanical unit at the time of switching so that the capacity of the first pump-motor becomes zero and no torque is imposed on the first pump-motor. Therefore, no energy flows in the switching section of the input/output shafts of the first pump-motor, which eliminates the need for a slipping clutch or the like and, in consequence, facilitates the switching.

Herein, the vehicle speed region which brings the rotation of the second pump-motor to a stop may be no less than a maximum torque point of the engine and no more than a rated torque point. Thereby, the rotation of the second pump-motor can be stopped over a wide range of engine rotating speeds so that switching can be more smoothly carried out and the transmission efficiency can be highly improved because transmission can be performed only by the mechanical unit over a wide range of vehicle speeds.

The controlling means may control the switching mechanism such that the first pump-motor is coupled to the output shaft in a vehicle speed region less than the maximum torque point of the engine and coupled to the input shaft in a vehicle speed region more than the rated torque point of the engine.

Further, the controlling means may control the switching mechanism according to a rotation signal of the output shaft of the engine and a rotation signal of the output shaft of the transmission.

According to a second aspect of the invention, there is provided a transmission comprising an input shaft, an output shaft, a planetary gear mechanism interposed between the input shaft and the output shaft, a first generator-motor, and a second generator-motor connected to the first generator-motor, the input shaft being coupled to a first element of the planetary gear mechanism, the second generator-motor being coupled to a second element of the planetary gear mechanism, and the output shaft being coupled to a third element of the planetary gear mechanism, the transmission further comprising:

a switching mechanism for selectively coupling the first generator-motor to either the input shaft or the output shaft.

The invention just described above not only has the same effect as of the hydraulic mechanical transmission described earlier but also provides a transmission superior to the hydraulic mechanical transmission in terms of efficiency.

In the invention, it is preferable to provide controlling means for controlling the switching mechanism so as to establish, during switching operation performed by the switching mechanism, a vehicle speed region which brings the rotation of the second generator-motor to a stop. Thereby, no energy flows to the switching section like the transmission described earlier, so that switching can be facilitated.

BEST MODE FOR CARRYING OUT THE INVENTION

Referring now to the accompanying drawings, the transmission of the invention will be described according to preferred embodiments.

First Embodiment

Figure 1:
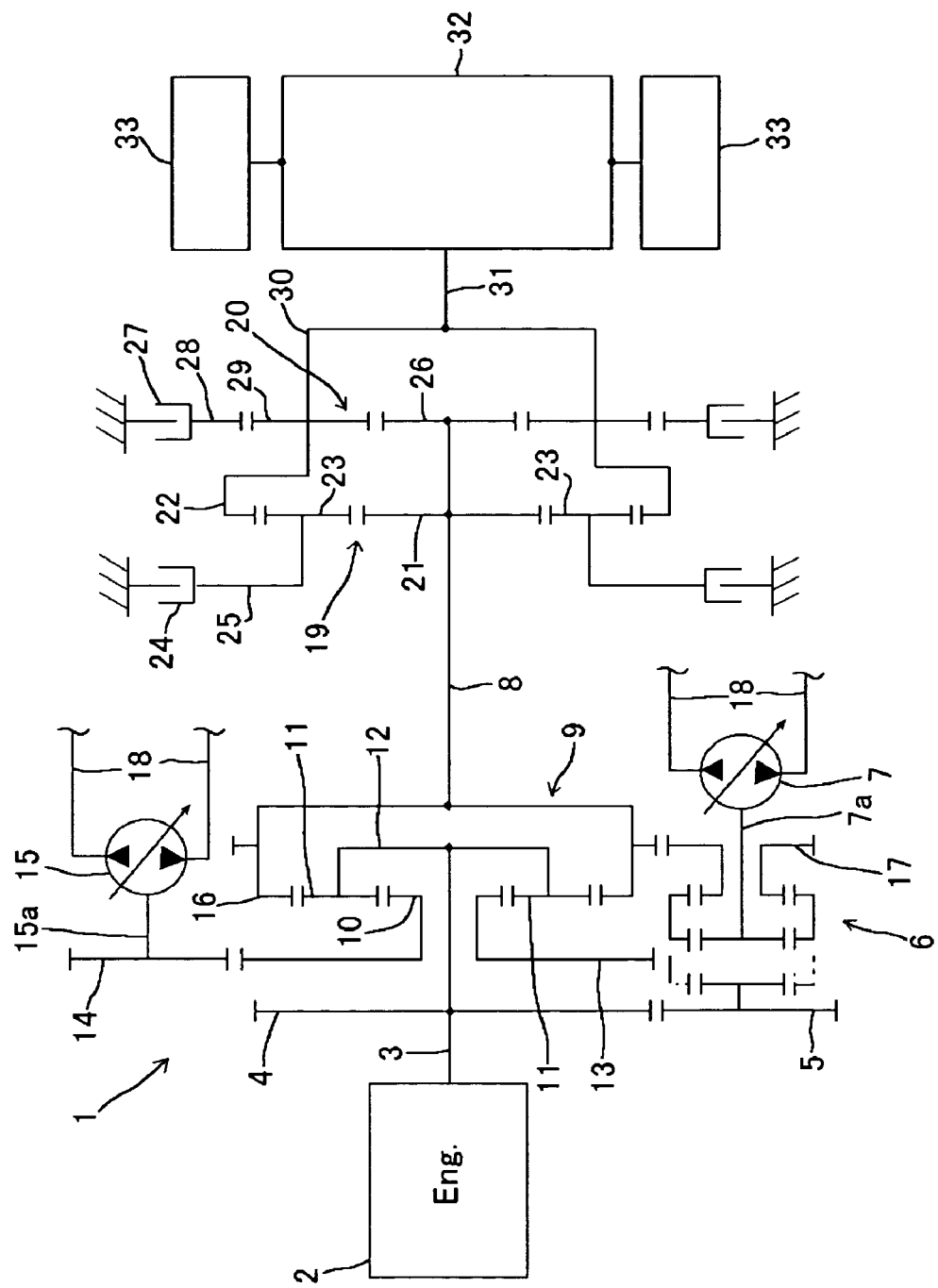
FIG. 1 is a schematic structural diagram of a transmission constructed according to a first embodiment of the invention.

FIG. 1 is a schematic structural diagram of a transmission constructed according to a first embodiment of the invention. While the invention is applied to the transmission of a track-type vehicle such as bulldozers in this embodiment, it is obvious that the invention is not limited to this application.

In a transmission 1 constructed according to this embodiment, a first gear 4 is secured to an input shaft 3 to which motive power from an engine 2 is input. A second gear 5 meshes with the first gear 4 such that the second gear 5 can be coupled to a shaft 7a of a first pump-motor 7 through a synchromesh mechanism 6. The synchromesh mechanism 6 is situated between the second gear 5 and a fifth gear 17 (described later), and upon switching of the synchromesh mechanism 6, the rotation of the shaft 7a is selectively brought into synchronization with the rotation of the second gear 5 or the rotation of the fifth gear 17.

Disposed between the input shaft 3 and an intermediate output shaft 8 which are aligned on the same axis line is a speed-change planetary gear mechanism 9. On the input shaft 3, a sun gear 10 of the speed-change planetary gear mechanism 9 is rotatably supported and a planetary carrier 12 for bearing a plurality of planetary gears 11 is secured. A third gear 13 having large diameter is integrally coupled to the sun gear 10. A fourth gear 14 meshes with the outer circumference of the third gear 13 and is secured to a shaft 15a of a second pump-motor 15. A ring gear 16 meshes with the outer circumference of the planetary gear set 11. Secured to the ring gear 16 is the intermediate output shaft 8. A fifth gear 17 meshes with the outer circumference of the ring gear 16, being rotatably borne by the shaft 7a of the first pump-motor 7. Herein, the first pump-motor 7 and the second pump-motor 15 are connected to each other through a hydraulic piping 18.

The intermediate output shaft 8 is provided with a reverse planetary gear mechanism 19 and a forward planetary gear mechanism 20 which are of the single planetary type. The reverse planetary gear mechanism 19 is composed of a sun gear 21 secured to the intermediate output shaft 8; a ring gear 22 located outside the sun gear 21; a planetary gear 23 located between the gears 21, 22 so as to mesh therewith; and a planetary carrier 25 for the planetary gear 23, which can be hydraulically braked by a reverse hydraulic clutch 24. The forward planetary gear mechanism 20 is composed of a sun gear 26 secured to the intermediate output shaft 8; a ring gear 28 that is located outside the sun gear 26 and can be hydraulically braked by a forward hydraulic clutch 27; a planetary gear 29 located between the gears 26, 28 so as to mesh therewith; and a planetary carrier 30 for the planetary gear 29, which is integrally secured to the ring gear 22 of the reverse planetary gear mechanism 19.

The planetary carrier 30 is coupled to an output shaft 31 which is in turn coupled to a hydraulically-steering type steering unit 32 disposed on a transverse shaft through a bevel gear. The steering unit 32 is coupled to right and left final reduction gears 33. Motive power transmitted from the output shaft 31 to the transverse shaft is then transmitted to right and left sprockets for driving right and left crawler belts respectively, through the steering unit 32, the final reduction gears 33 and others.

Figure 2:
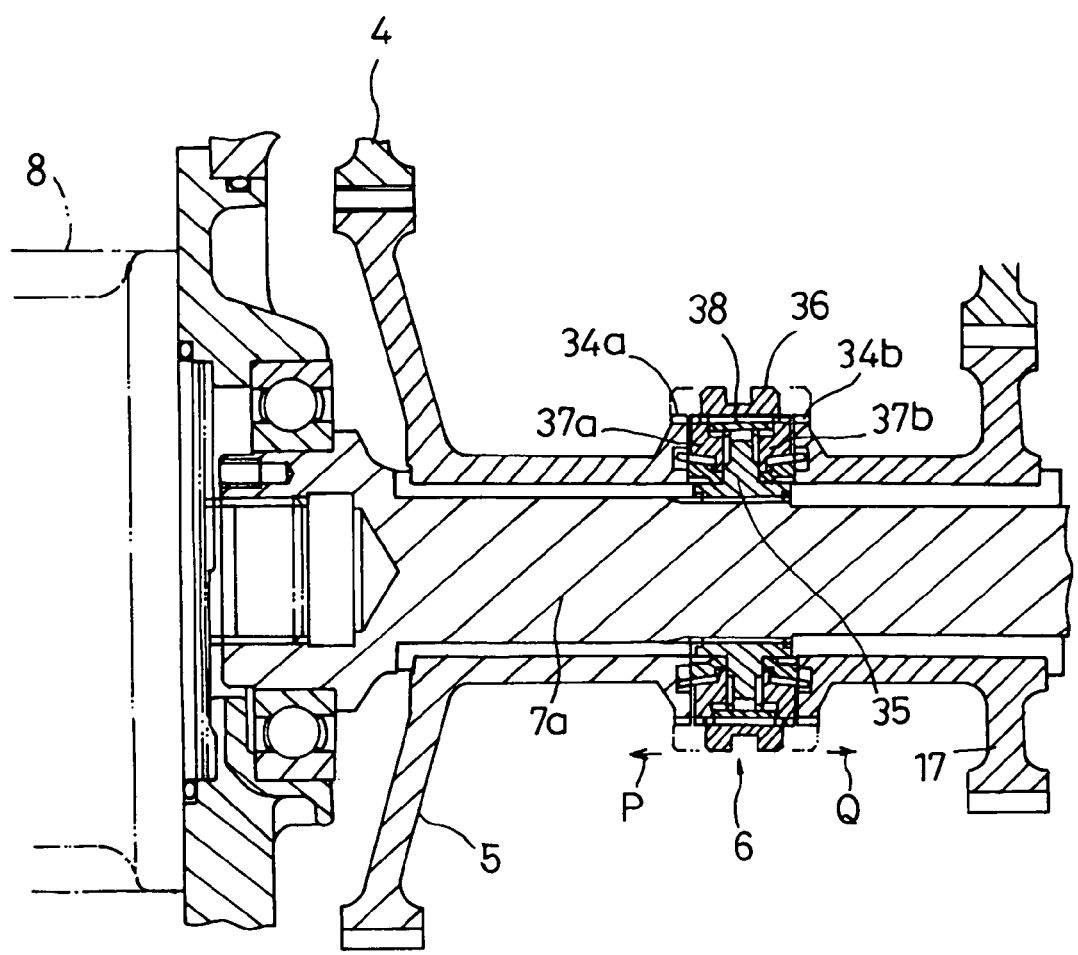
FIG. 2 is a sectional view showing a detailed structure of a synchromesh mechanism.

Next, the detailed structure of the synchromesh mechanism 6 will be described with reference to FIG. 2. The synchromesh mechanism 6 is disposed between the second gear 5 and the fifth gear 17, having (i) a clutch gear 34a rotatable integrally with the second gear 5; (ii) a clutch gear 34b rotatable integrally with the fifth gear 17; (iii) a clutch hub 35 having a boss spline-fitted in the shaft 7a of the first pump-motor 7; (iv) a sleeve 36 which is spline-fitted in the outer circumferential surface of the clutch hub 35 so as to be movable in an axial direction of the shaft 7a; (v) synchronizer rings 37a, 37b interposed between the clutch gears 34a, 34b and the sleeve 36 so as to be friction-engaged with the clutch gears 34a, 34b; (vi) a synchronizer key 38 disposed between the sleeve 36 and the synchronizer rings 37a, 37b; and others.

In the synchromesh mechanism 6, the sleeve 36 is moved in the axial direction of the shaft 7a indicated by arrow P, thereby pressing the synchronizer key 38 against the synchronizer ring 37a so that the synchronizer ring 37a is brought into friction-engagement with the clutch gear 34a. This synchronizes the rotating speeds of the synchronizer ring 37a and the clutch gear 34a so that they rotate in an integral fashion. Thereafter, the sleeve 36 is further moved, which brings the spline grooves of the sleeve 36 into contact with the dog teeth of the synchronizer ring 37a, starting the synchronization of the synchronizer ring 37a and the sleeve 36. At the time when the spline grooves of the sleeve 36 completely engage with the dog teeth of the synchronizer ring 37a, the synchronization of the sleeve 36 and the second gear 5 is finished. In this way, the difference, in rotating speed, between the sleeve 36 and the second gear 5 is eliminated and the sleeve 36 engages with the dog teeth of the clutch gear 34a, passing through the clearances between the dog teeth of the synchronizer ring 37a. The clutch hub 35 and the second gear 5 are integrally combined through the sleeve 36 so that the rotational driving force of the shaft 7a is transmitted to the second gear 5. If the sleeve 36 is moved in the axial direction of the shaft 7a indicated by arrow Q, the clutch hub 35 and the fifth gear 17 are integrally combined through the sleeve 36 in a similar manner, so that the rotational driving force of the shaft 7a is transmitted to the fifth gear 17.

Figure 18:
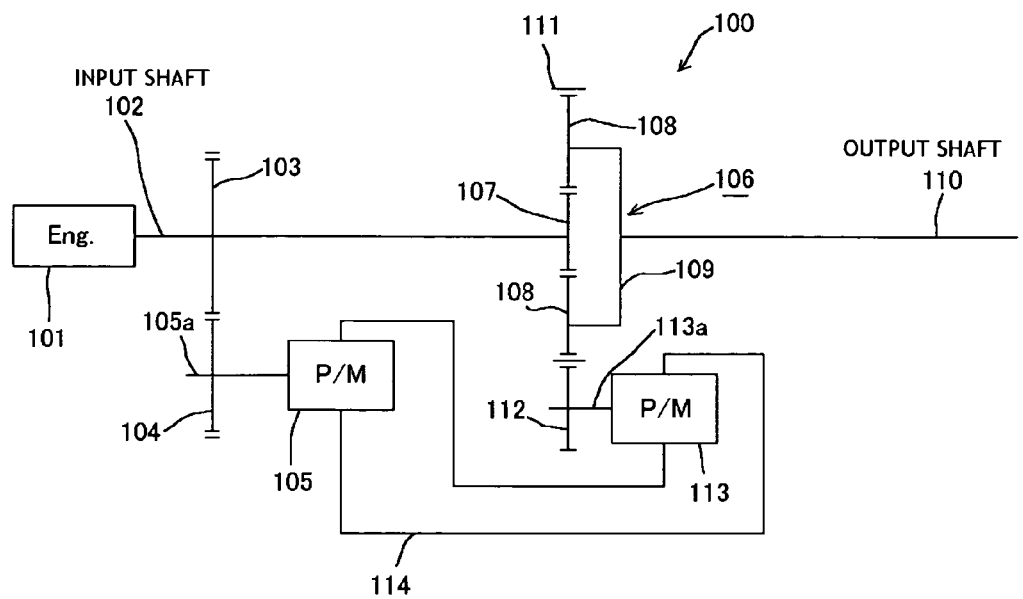
FIGS. 18 (*a*) and 18(*b*) are a schematic structural diagram and transmitted horse power characteristic graph, respectively, of an output split type HMT having two pump-motors.
Figure 18:
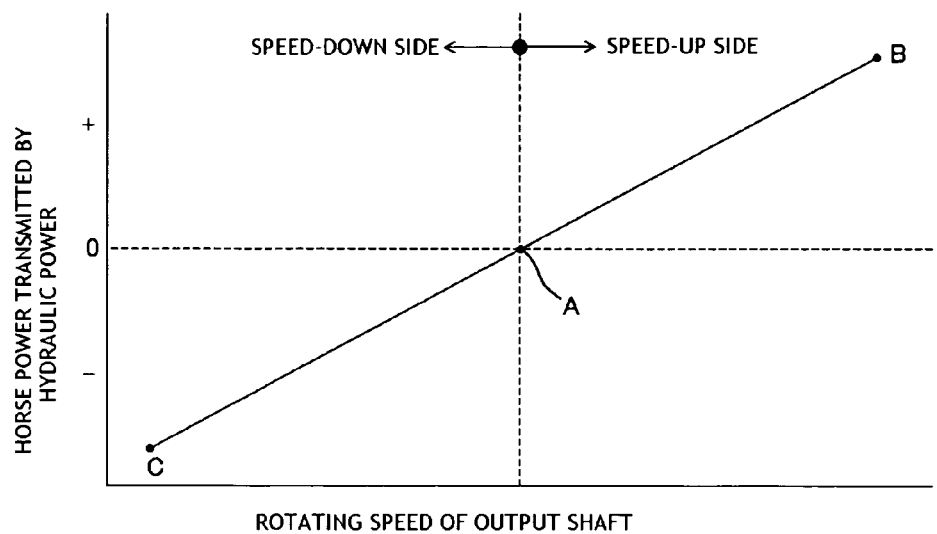
Figure 19:
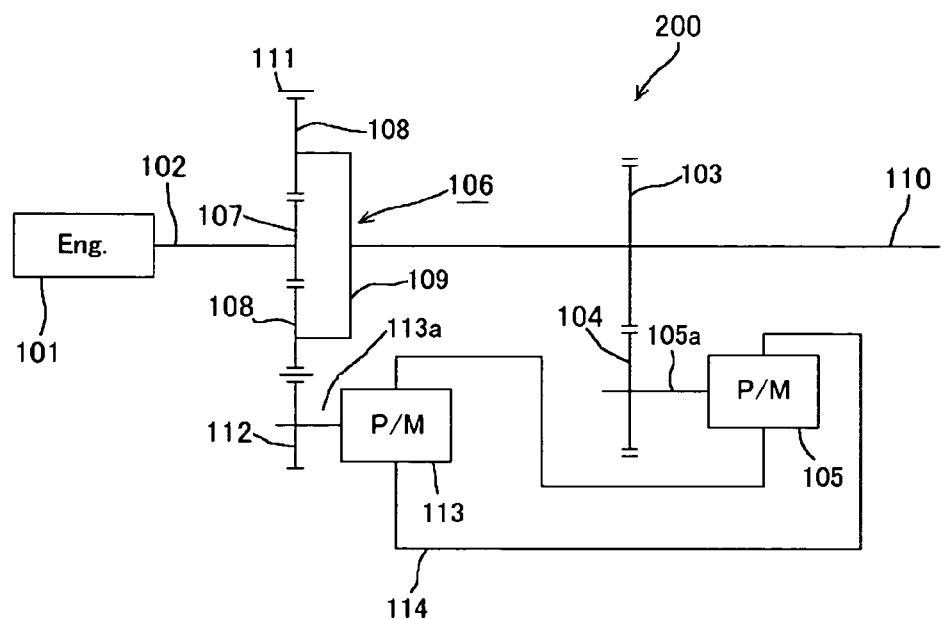
FIGS. 19 (*a*) and 19(*b*) are a schematic structural diagram and transmitted horse power characteristic graph, respectively, of an input split type HMT having two pump-motors.
Figure 19:
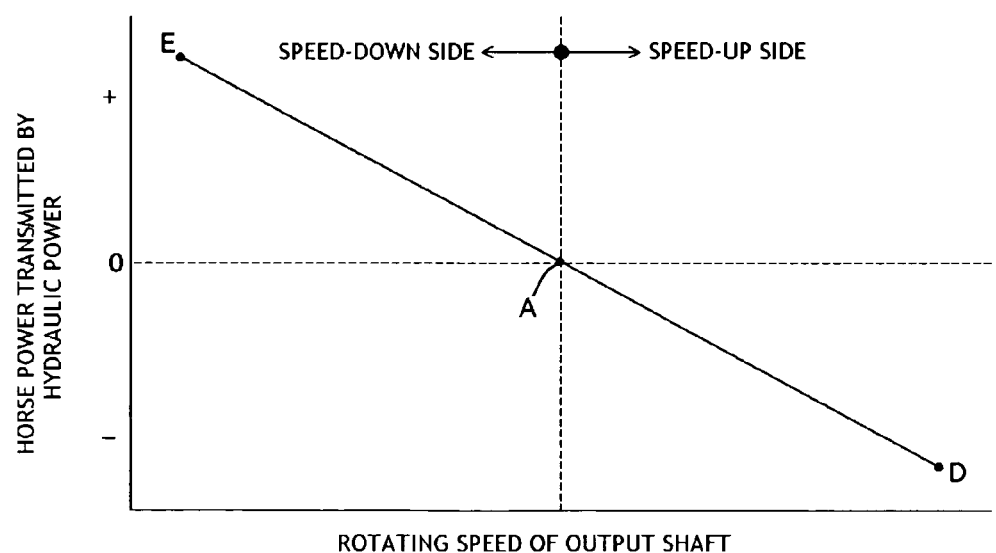
Figure 20:
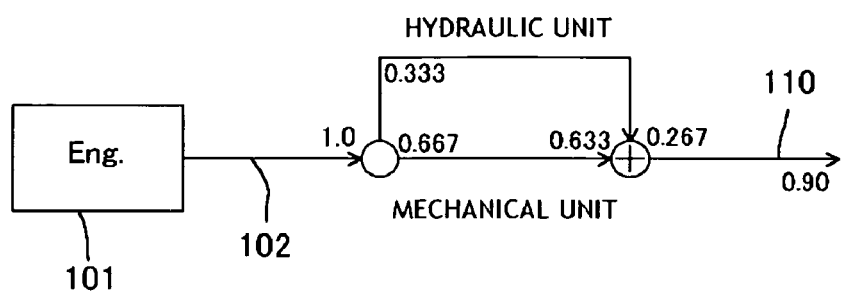
FIGS. 20(a) and 20(b) are diagrams each illustrating the difference in efficiency between energy flows.
Figure 20:
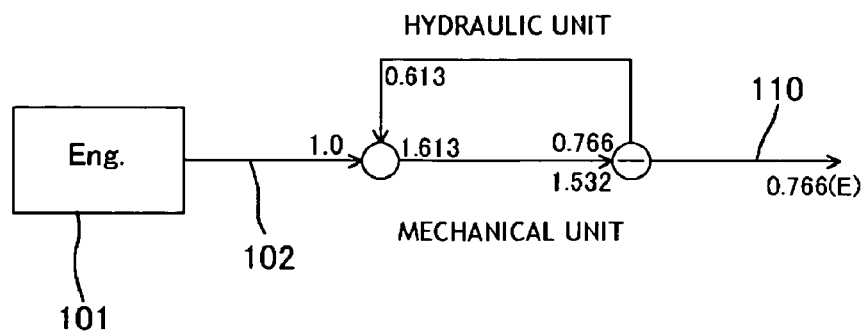

According to the transmission 1 of the first embodiment, when the shaft 7a of the first pump-motor 7 is coupled to the second gear 5 side by the synchromesh mechanism 6, the first pump-motor 7 is positioned on the input shaft 3 side so that the transmission 1 serves as an output split type transmission (see FIG. 18). When the shaft 7a of the first pump-motor 7 is coupled to the fifth gear 17 side, the first pump-motor 7 is positioned on the intermediate output shaft 8 side so that the transmission 1 serves as an input split type transmission (see FIG. 19).

More specifically, if the shaft 7a of the first pump-motor 7 is coupled to the second gear 5 side when the rotating speed of the intermediate output shaft 8 is on the speed-up side, the first pump-motor 7 serves as a pump whereas the second pump-motor 15 serves as a motor. Therefore, energy flows from the first pump-motor 7 to the second pump-motor 15 through the medium of oil pressure. In other words, the hydraulic power flows in a forward direction from the input shaft 3 to the intermediate output shaft 8 side. Thus, the motive power of the engine 2 is input to the planetary carrier 12 and the motive power of the second pump-motor 15 serving as a motor is input to the sun gear 10. And, the rotational motive power of the planetary carrier 12 is output to the input shaft (shaft 7a) of the first pump-motor 7 serving as a pump and the rotational motive power of the ring gear 16 is output to the intermediate output shaft 8.

If the shaft 7a of the first pump-motor 7 is coupled to the fifth gear 17 side when the rotating speed of the intermediate output shaft 8 is on the speed-down side, the first pump-motor 7 serves as a motor whereas the second pump-motor 15 serves as a pump. Therefore, energy flows from the second pump-motor 15 to the first pump-motor 7 through the medium of oil pressure. In other words, the hydraulic power flows in a forward direction from the input shaft 3 to the intermediate output shaft 8 side. Thus, the motive power of the engine 2 is input to the planetary carrier 12 and the motive power of the first pump-motor 7 serving as a motor is input to the ring gear 16. And, the rotational motive power of the sun gear 10 is output to the input shaft (shaft 15a) of the second pump-motor 15 serving as a pump and the rotational motive power of the ring gear 16 is output to the intermediate output shaft 8.

Figure 3:
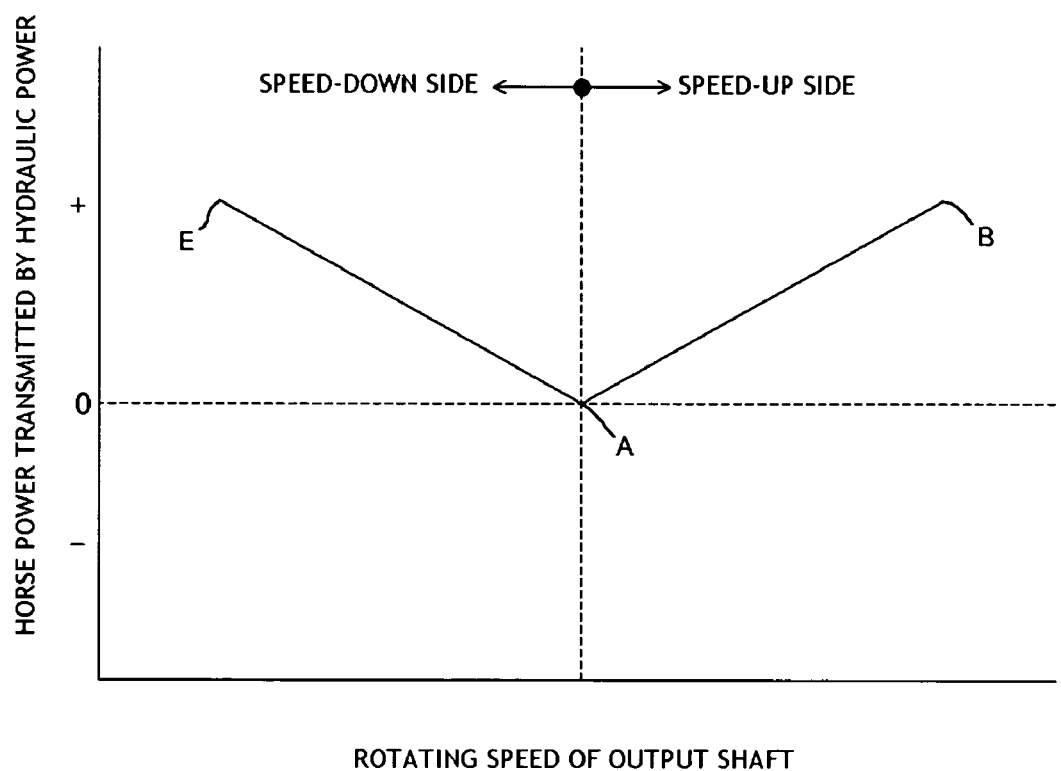
FIG. 3 is a transmitted horse power characteristic graph according to the first embodiment.

As described above, the transmission 1 of the first embodiment serves as an output split type transmission when the intermediate output shaft 8 is on the speed-up side and serves as an input split type transmission when it is on the speed-down side, so that the horse power transmitted by the hydraulic power is plus (+) at all times irrespective of the rotating speed of the intermediate output shaft 8 as shown in FIG. 3. This allows the hydraulic power to constantly flow in the forward direction. Accordingly, the transmission 1 not only can achieve higher transmission efficiency, compared to the conventional input split type and output split type transmissions but also can reduce the design strength of the mechanical unit (planetary gear mechanism), which contributes to a reduction in the size of the whole system and costs. In addition, since only the synchromesh mechanism 6 is involved in mechanical switching and the planetary gear mechanism 9 is of the single-planetary type, the transmission 1 can be constructed in an extremely simple structure compared to the transmission disclosed in Japanese Published Unexamined Patent Application No. 2001-200900 and can increase the operability of the vehicle because it does not suffer from a torque shortage.

Although switch-over between the output split type and the input split type is done by coupling the shaft 7a of the first pump-motor 7 to the second gear 5 or the fifth gear 17, all the motive power is transmitted through the mechanical unit when the rotation of the second pump-motor 15 is stopped, irrespective of which of the second and fifth gears 5, 17 is coupled to the shaft 7a of the first pump-motor 7 (hereinafter, this state (region) is referred to as "direct mode (direct region)".

The planetary gear mechanism 9 of this embodiment is of the high rotation type in which, in the direct mode, the rotating speed of the input shaft 3 is higher than that of the intermediate output shaft 8, and therefore the torque of the intermediate output shaft 8 is relatively low and miniaturization is possible by making the forward/reverse gear shifting section have low torque. In addition, according to the planetary gear mechanism 9 of this embodiment, the size of the pump can be reduced by increasing the rotational speed of the pump.

In this embodiment, when switching the shaft 7a of the first pump-motor 7 so as to be coupled to the second gear 5 or the fifth gear 17 by the synchromesh mechanism 6, the transmission 1 is in a state where all the motive power is transmitted through the mechanical unit alone (i.e., the direct mode) and the second pump-motor 15 is stopped. At that time, the capacity of the first pump-motor 7 is zero and no torque is imposed on the shaft 7a of the first pump-motor 7. Therefore, no energy flows to the switching section during the switching of the gears, which obviates the need for a slipping clutch or the like so that the gear shifting can be facilitated.

Although the above gear shifting is done when the rotation of the second pump-motor 15 is stopped, the rotational speeds of the input shaft 3 and the intermediate output shaft 8 vary depending on the number of teeth of the planetary gear mechanism 9 and are not necessarily the same. However, the ratio between the rotating speeds of these shafts is constant and therefore it is desirable to make the rotating speeds of the second gear 5 and the fifth gear 17 substantially equal at the time of switching between them. The gear ratio is set so as to be changeable by changing the allowable pressure or allowable rotating speed of the first pump-motor 7 when connecting the shaft 7a of the first pump-motor 7 to the second gear 5 or the fifth gear 17.

Figure 4:
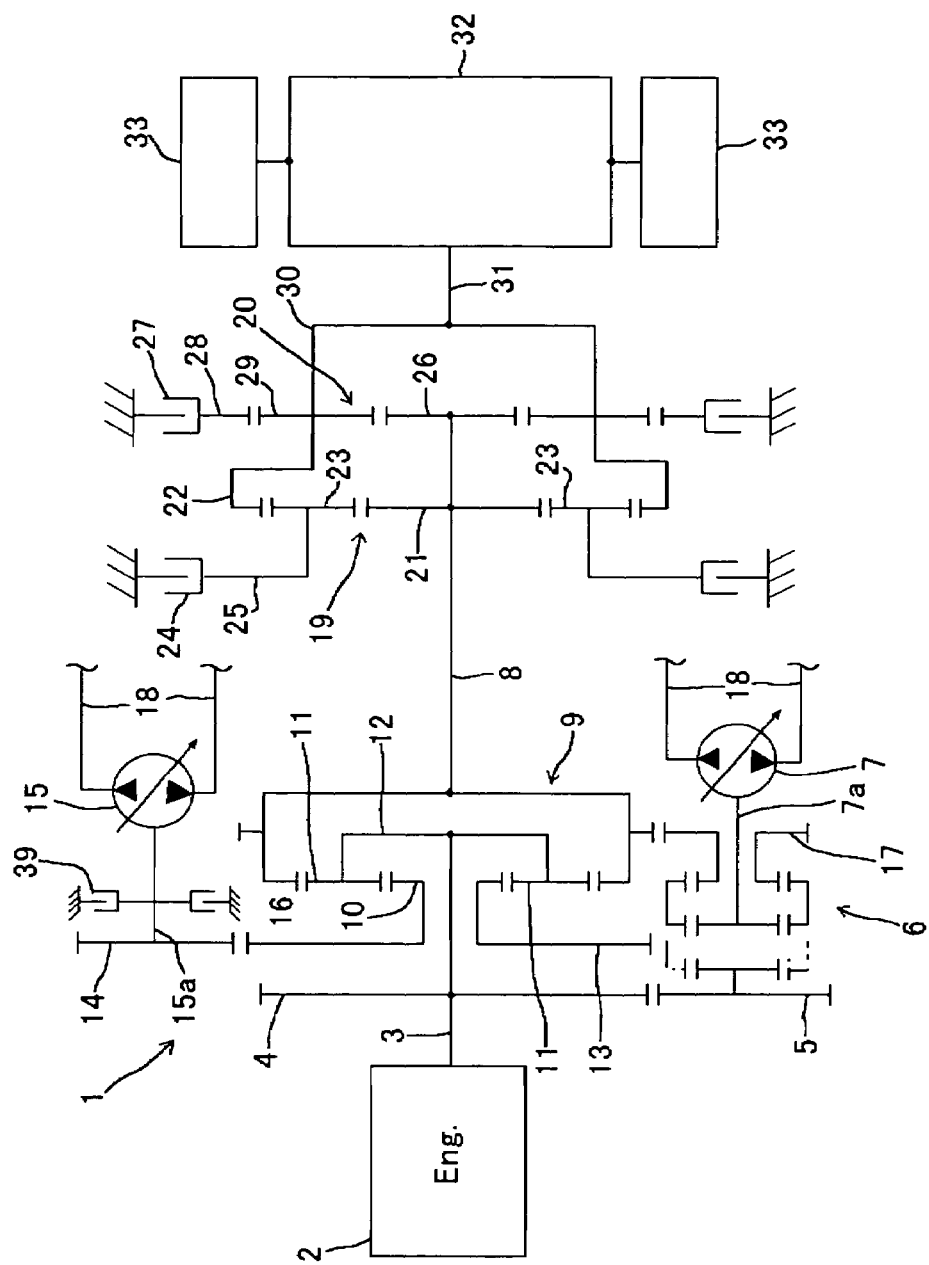
FIG. 4 is a schematic structural diagram of a transmission according to a modification of the first embodiment.

FIG. 4 shows a modification of the transmission of the first embodiment. In this modification, the shaft 15a of the second pump-motor 15 is provided with a mechanical brake 39. This modification does not differ from the first embodiment shown in FIG. 1 except this point. Therefore, the parts shown in FIG. 4 which are identical with those of the first embodiment are identified by the same reference numerals as of the first embodiment and a detailed description of them is skipped herein.

In the direct region which brings the rotation of the second pump-motor 15 to be stopped, all the motive power is transmitted through the mechanical unit irrespective of whether the second gear 5 or the fifth gear 17 is coupled to the shaft 7a of the first pump-motor 7. In the direct region, the capacity of the first pump-motor 7 is zero, but if the rotation of the second pump-motor 15 is stopped by blocking oil pressure in the first pump-motor 7, a power loss corresponding to the leakage of the pressure oil from the first pump-motor 7 occurs. To avoid this, this modification is designed such that the mechanical brake 39 provided for the shaft 15a of the second pump-motor 15 is brought into operation while the direct mode is selected, thereby preventing a rise of oil pressure between the pump-motors 7 and 15. It should be noted that the mechanical brake 39 of this modification corresponds to the outflow preventing means of the invention.

In place of the mechanical brake 39 described above, an arrangement may be employed as the outflow preventing means, in which a solenoid-type shut-off valve is interposed in the hydraulic piping 18 for connecting the first pump-motor 7 and the second pump-motor 15 to each other and operated so as to close while the direct mode being selected, thereby preventing a leakage of pressure oil from the first pump-motor 7.

Figure 5:
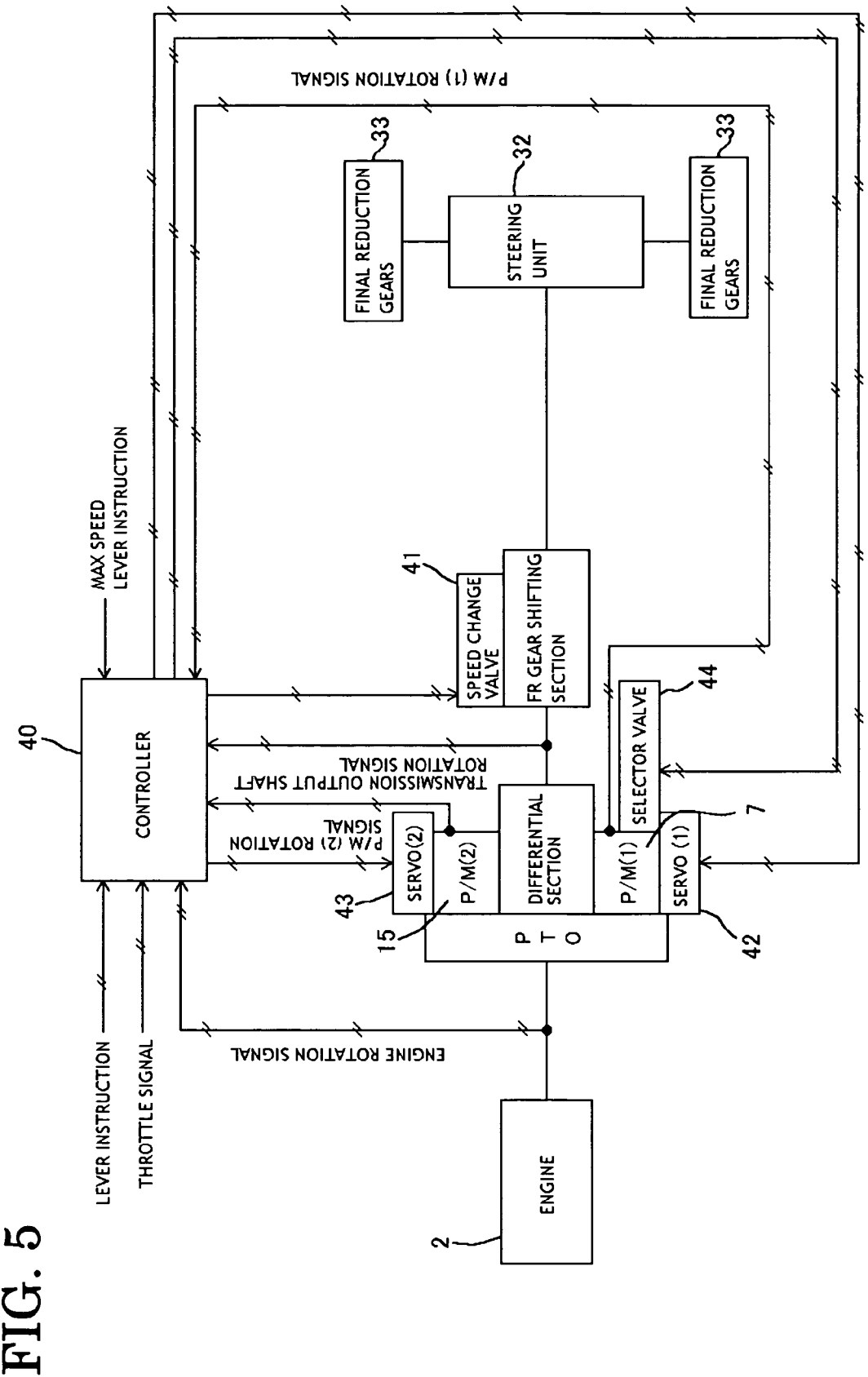
FIG. 5 is a control block diagram of the transmission according to the first embodiment.
Figure 6:
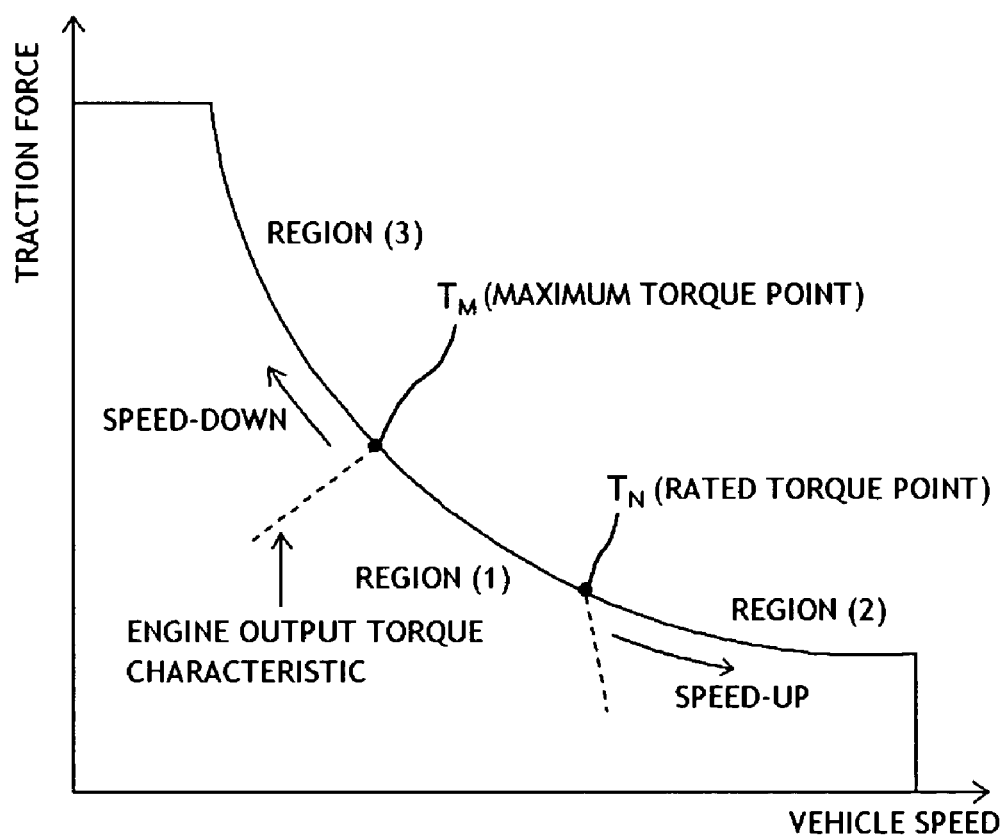
FIG. 6 is a traction force-vehicle speed characteristic graph according to the first embodiment.

Next, reference is made to the control block diagram of FIG. 5 and the vehicle traction force-vehicle speed characteristic graph of FIG. 6 to explain the contents of the switching control processing performed by the synchromesh mechanism 6 according to the present embodiment.

Referring to the control block diagram of FIG. 5, the output shaft of the engine 2 is provided with an engine rotating speed detector for detecting the rotating speed of the output shaft of the engine 2, and the output shaft (intermediate output shaft 8) of the differential section (planetary gear mechanism 9) is provided with a transmission output shaft rotating speed detector for detecting the rotating speed of the output shaft of the differential section. An engine throttle (not shown) is provided with a throttle position detector for detecting the throttle position of the engine throttle while it is in operation. Similarly, a change lever (not shown) is provided with a lever position detector for checking which of the forward position (F), neutral position (N), reverse position (R) the change lever is placed in while it is in operation and for detecting a maximum speed lever instruction signal. Further, the shaft 7a of the first pump-motor 7 is provided with a rotating speed detector for detecting the rotating speed of the shaft 7a, whereas the shaft 15a of the second pump-motor 15 is provided with a rotating speed detector for detecting the rotating speed of the shaft 15a. Signals issued from these rotating speed detectors, the throttle position detector and the lever position detector are supplied to the controller (controlling means) 40.

The controller 40 is composed of a central processing unit (CPU) for executing a specified program; a read-only memory (ROM) for storing this program and various tables; and a writable memory serving as a working memory necessary for executing this program. The controller 40 performs arithmetic processing through execution of the above program based on the engine rotation signal, transmission output shaft rotation signal, throttle signal, lever instruction signal and pump-motor rotation signal, thereby supplying a switchover control signal to a speed change valve 41 for switching between the reverse hydraulic clutch 24 and the forward hydraulic clutch 27. An angle control signal is supplied to a servo mechanism 42 for controlling the swash plate angle of the first variable displacement pump-motor 7 and to a servo mechanism 43 for controlling the swash plate angle of the second variable displacement pump-motor 15. Further, a switchover signal is supplied to a selector valve 44 for shifting the sleeve 36 of the synchromesh mechanism 6.

The control of the transmission 1 performed by the controller 40 will be explained.

As shown in the traction force-vehicle speed characteristic graph of FIG. 6, the vehicle speed region is divided into three parts beforehand. The first part (REGION (1)) is the direct region allowing all the motive power of the engine 2 to be transmitted through the mechanical unit and is also a vehicle speed region allowing the engine 2 to rotate at speeds no less than a maximum torque point $T_M$ and no more than a rated torque point $T_N$. The second part (REGION (2)) is a region in which vehicle speed exceeds that of REGION (1) and the third part (REGION (3)) is a region in which vehicle speed is lower than that of REGION (1).

Figure 7:
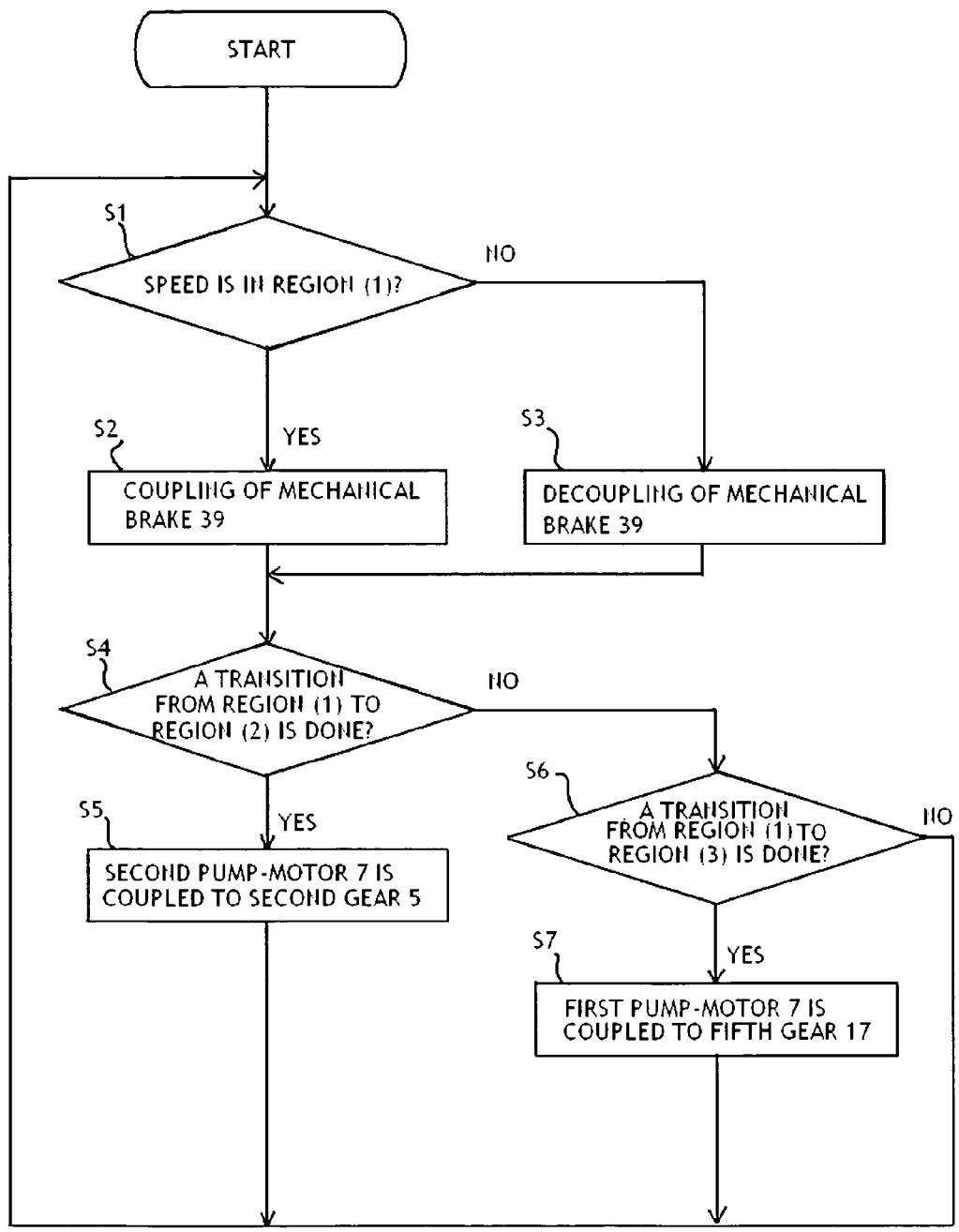
FIG. 7 is a flow chart of a control method for the transmission according to the first embodiment.

FIG. 7 is a flow chart showing a control method for the transmission of the first embodiment. In Step S1, a check is made to determine whether a vehicle speed detected by the transmission output shaft rotating speed detector falls within REGION (1). If the result of the check is YES, the program proceeds to Step S 2 at which the mechanical brake 39 is engaged thereby stopping the second pump-motor 15, and then the program proceeds to Step S4. If the result of the check at Step S1 is NO, the program proceeds to Step S3 at which the mechanical brake 39 is disengaged to bring the second pump-motor 15 into a rotatable condition, and then, the program proceeds to Step S4. At Step S4, a check is made to determine whether vehicle speed has transitioned from REGION (1) to REGION (2). If the result of the check at Step S4 is YES (i.e., if it is determined that vehicle speed has exceeded the rated torque point TN), the program proceeds to Step S5. At Step S5, the selector valve 44 is controlled so as to engage the first pump-motor 7 with the second gear 5 (the input shaft 3 side), that is, so as to switch the transmission 1 to the output split type, and thereafter, the program returns to Step S1. If the result of the check at Step S4 is NO, the program proceeds to Step S6. At Step S6, it is checked whether vehicle speed transitions from REGION (1) to REGION (3). If the result of the check at Step S6 is YES (i.e., if it is judged that vehicle speed has dropped from the maximum torque point TM), the program proceeds to Step S7. At Step S7, the selector valve 44 is controlled so as to couple the first pump-motor 7 to the fifth gear 17 (the intermediate output shaft 8 side), that is, so as to switch the transmission 1 to the input split type, and thereafter, the program returns to Step S1. If the result of the check at Step S6 is NO, the program returns to Step S1 without change.

If the mechanical brake for stopping the rotation of the second pump-motor 15 is not provided as shown in FIG. 1, Steps S1, S2 and S3 are unnecessary.

As described earlier, REGION (1) is the direct region which allows all the motive power of the engine 2 to be transmitted through the mechanical unit alone and also the region which disallows rotation of the second pump-motor 15. In this region, the capacity of the first pump-motor 7 is zero and the shaft 7a is in a free condition without torque transmission. Accordingly, switching can be easily done when the first pump-motor 7 is coupled to the second gear 5 (the input shaft 3 side) as well as when the first pump-motor 7 is coupled to the fifth gear 17 (the intermediate output shaft 8 side).

In the first embodiment, since the switching point between REGION (1) and REGION (3) is used as the maximum torque point $T_M$ and the switching point between REGION (1) and REGION (2) as the rated torque point $T_N$, a wide speed range is covered by REGION (1) so that undesirable hunting caused by switching of the synchromesh mechanism 6 does not occur. More specifically, if the vehicle is accelerated with vehicle speed increasing from REGION (3) to REGION (1) and then to REGION (2) as shown in FIG. 6, the sleeve 36 of the synchromesh mechanism 6 does not move before the vehicle speed reaches the rated torque point $T_N$. On the other hand, if the vehicle is decelerated with vehicle speed decreasing from REGION (2) to REGION (1) and then to REGION (3), the sleeve 36 of the synchromesh mechanism 6 does not move before the vehicle speed reaches the maximum torque point $T_M$. Accordingly, there is no likelihood that the synchromesh mechanism 6 is frequently switched at a certain vehicle speed.

In cases where the range of vehicle speed in REGION (1) is so small that hunting occurs in a certain vehicle speed region, it can be effectively avoided by providing hysteresis characteristics for the switching between speed-up and speed-down. An instance of the hysteresis characteristics will be explained with reference to FIG. 6: During a transition of vehicle speed from REGION (1) to REGION (2), the synchromesh mechanism 6 is switched at the time the actual vehicle speed exceeds the vehicle speed corresponding to the switching point (the point $T_N$) by a specified amount. During a transition of vehicle speed from REGION (1) to REGION (3), the synchromesh mechanism 6 is switched at the time the actual vehicle speed drops from the vehicle speed corresponding to the maximum torque point $T_M$ by a specified amount. This prevents the synchromesh mechanism 6 from being frequently switched in a vehicle speed region near each speed change point.

Second Embodiment

Figure 8:
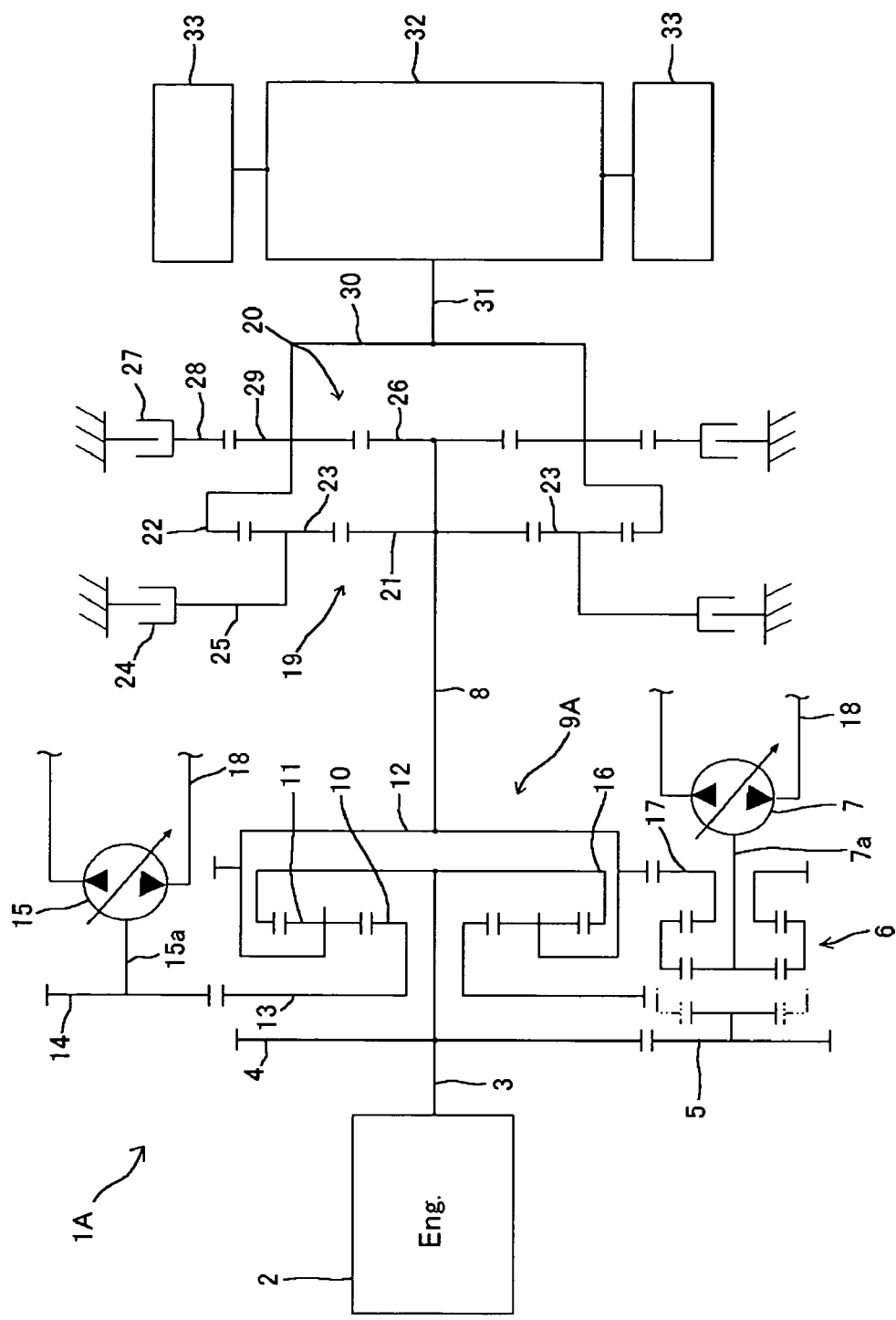
FIG. 8 is a schematic structural diagram of a transmission constructed according to a second embodiment of the invention.

FIG. 8 shows a schematic structural diagram of a transmission according to a second embodiment of the invention. The transmission 1A of the second embodiment does not basically differ from that of the first embodiment except the structure of a speed-change planetary gear mechanism 9A. Therefore, the parts of the second embodiment which correspond to those of the first embodiment are identified by the same reference numerals as of the first embodiment and a detailed description of them is skipped herein (the same applies to each of the following embodiments).

In the speed-change planetary gear mechanism 9A of the second embodiment, the sun gear 10 is rotatably borne by the input shaft 3 and the ring gear 16 is fixed to the input shaft 3. The planetary carrier 12 for bearing the planetary gears 11 is fixed to the intermediate output shaft 8. Meshing with the outer circumference of the planetary carrier 12 is the fifth gear 17.

In the transmission 1A of the second embodiment, if the shaft 7a of the first pump-motor 7 is coupled to the second gear 5 side while the rotating speed of the intermediate output shaft 8 is on the speedup side, the motive power of the engine 2 is input to the ring gear 16 whereas the motive power of the second pump-motor 15 serving as a motor is input to the sun gear 10, so that the motive powers of the sun gear 10 and the ring gear 16 are combined into the rotational motive power of the planetary carrier 12 to be output to the intermediate output shaft 8. On the other hand, if the shaft 7a of the first pump-motor 7 is coupled to the fifth gear 17 side while the rotating speed of the intermediate output shaft 8 is on the speed-down side, the motive power of the engine 2 is input to the ring gear 16 and then output to the input shaft 15a of the second pump-motor 15 serving as a pump and also output to the planetary carrier 12. The motive power output to the planetary gear 12 is then output to the intermediate output shaft 8. The motive power output to the second pump-motor 15 is transmitted to the first pump-motor 7 through the hydraulic piping 18. At that time, the shaft 7a is connected to the gear 17 by the synchromesh mechanism 6 so that the motive power is transmitted from the shaft 7a to the planetary carrier 12 through the gear 17 and then output to the intermediate output shaft 8.

According to the speed-change planetary gear mechanism 9A of the second embodiment, the rotating speeds of the first and second pump-motors 7, 15 can be lowered.

Third Embodiment

Figure 9:
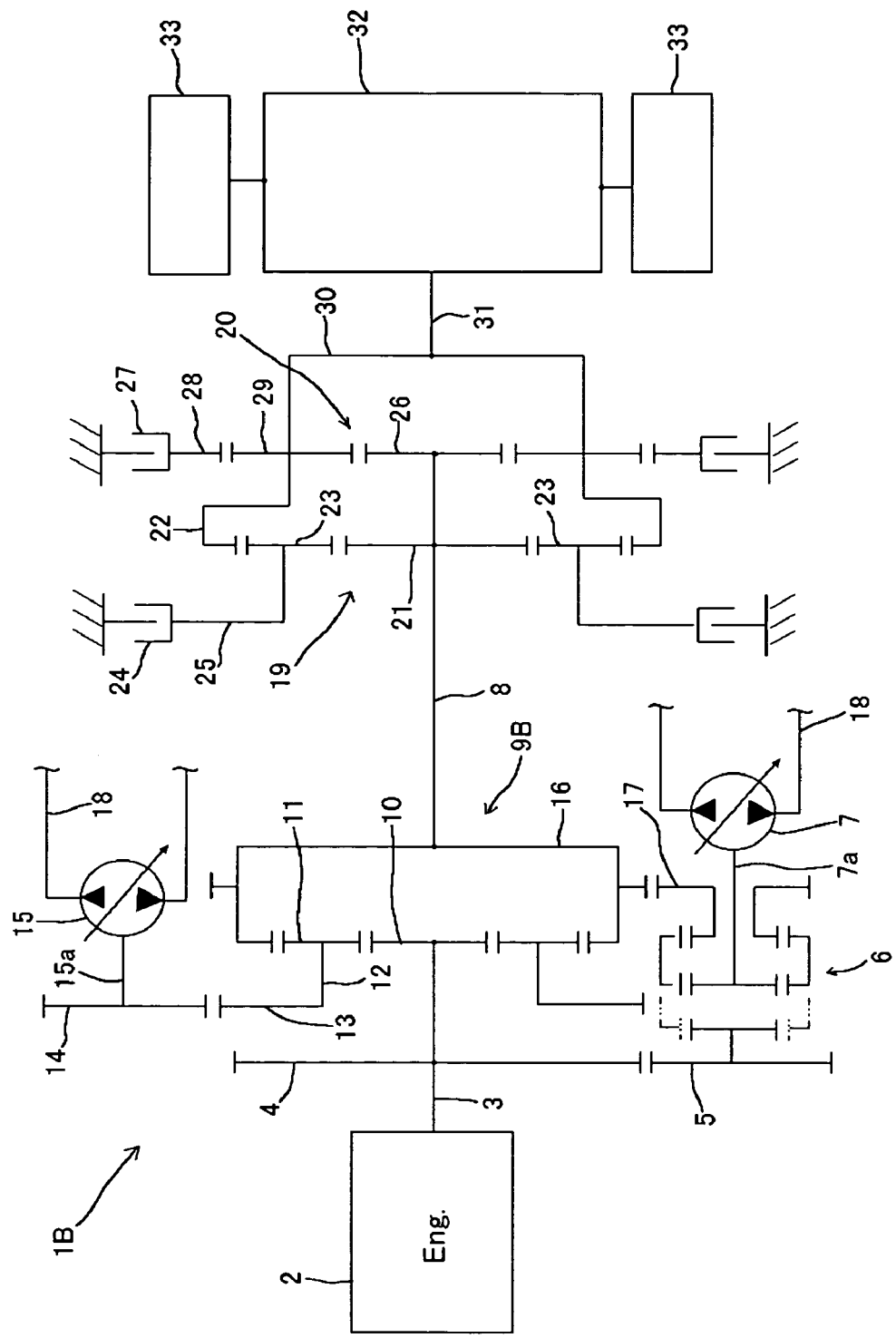
FIG. 9 is a schematic structural diagram of a transmission constructed according to a third embodiment of the invention.

FIG. 9 shows a schematic structural diagram of a transmission according to a third embodiment of the invention.

In a speed-change planetary gear mechanism 9B according to the third embodiment, the sun gear 10 is fixed to the input shaft 3 and the ring gear 16 is fixed to the intermediate output shaft 8. The fifth gear 17 meshes with the outer circumference of the ring gear 16. The planetary carrier 12 for bearing the planetary gears 11 is integrally coupled to the third gear 13.

In the transmission 1B of the third embodiment, if the shaft 7a of the first pump-motor 7 is coupled to the second gear 5 side while the rotating speed of the intermediate output shaft 8 is on the speed-up side, the motive power of the engine 2 is input to the sun gear 10 whereas the motive power of the second pump-motor 15 serving as a motor is input to the planetary gear 12, so that these motive powers are combined and output as the rotary motion of the ring gear 16 to be transmitted to the intermediate output shaft 8. On the other hand, if the shaft 7a of the first pump-motor 7 is coupled to the fifth gear 17 side while the rotating speed of the intermediate output shaft 8 is on the speed-down side, the motive power of the engine 2 is input to the sun gear 10 and then output to the second pump-motor 15 serving as a pump and to the ring gear 16. The motive power transmitted to the second pump-motor 15 is then transmitted to the first pump-motor 7 through the hydraulic piping 18. This motive power is transmitted to the ring gear 16 through the shaft 7a and the gear 17 and further output to the intermediate output shaft 8.

According to the speed-change planetary gear mechanism 9B of the third embodiment, the rotating speeds of the first and second pump-motors 7, 15 can be further lowered, compared to the speed-change planetary gear mechanism 9A of the second embodiment. However, the forward/reverse gear shifting section is subjected to higher torque.

Fourth Embodiment

Figure 10:
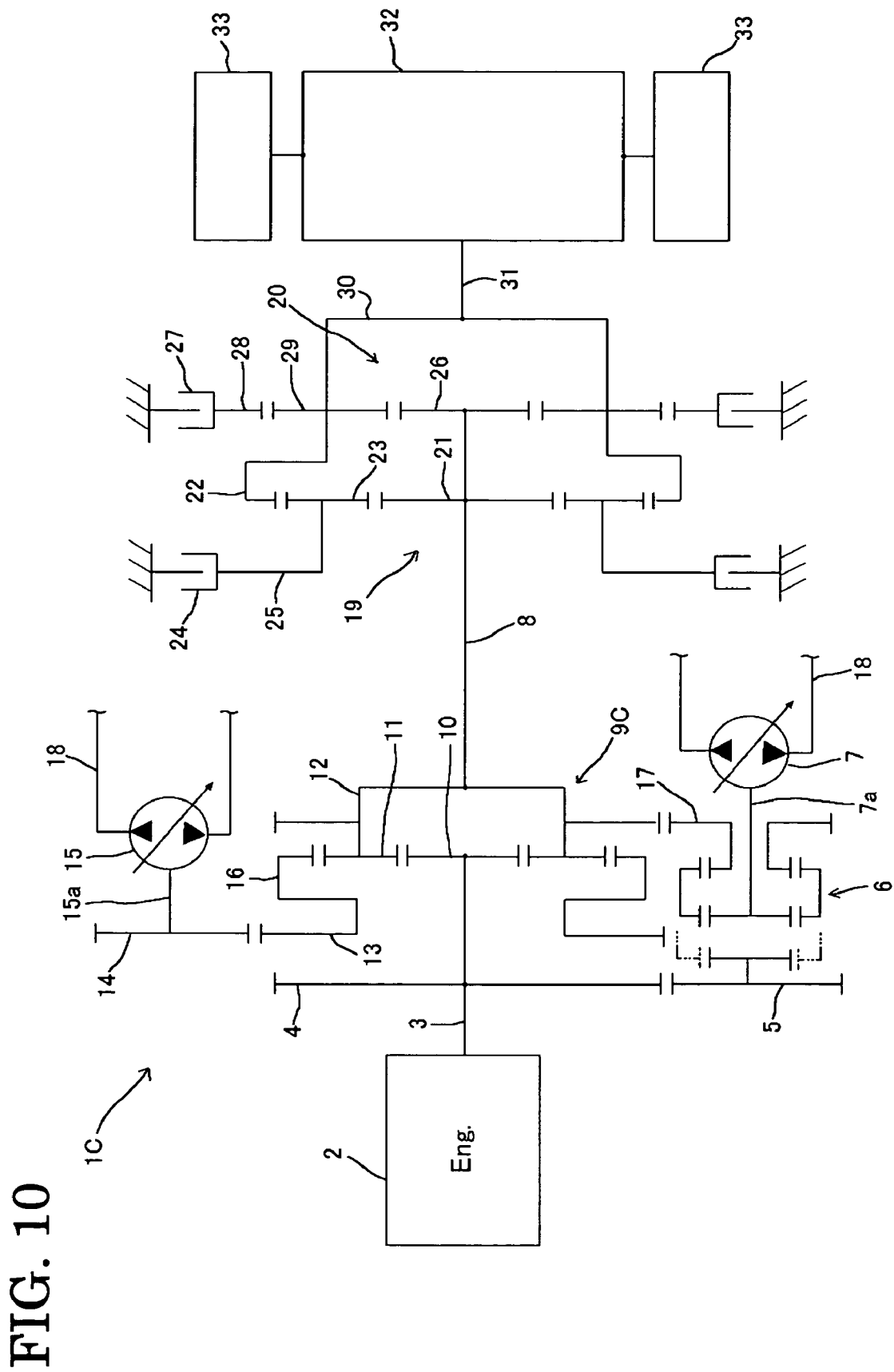
FIG. 10 is a schematic structural diagram of a transmission constructed according to a fourth embodiment of the invention.

FIG. 10 shows a schematic structural diagram of a transmission according to a fourth embodiment of the invention.

In a speed-change planetary gear mechanism 9C according to the fourth embodiment, the sun gear 10 is fixed to the input shaft 3 and the planetary carrier 12 for bearing the planetary gears 11 is fixed to the intermediate output shaft 8. The fifth gear 17 meshes with the outer circumference of the planetary carrier 12. The third gear 13 is integrally coupled to the ring gear 16.

In the transmission 1C of the fourth embodiment, if the shaft 7a of the first pump-motor 7 is coupled to the second gear 5 side while the rotating speed of the intermediate output shaft 8 is on the speed-up side, the motive power of the engine 2 is transmitted from the sun gear 10 and the gear 5 to the shaft 7a through the synchromesh mechanism 6 and then transmitted to the first pump-motor 7 connected to the shaft 7a so that the first pump-motor 7 acts as a pump. Then, the motive power is transmitted from the first pump/motor 7 to the second pump-motor 15 serving as a motor through the hydraulic piping 18. Then, the motive power is transmitted to the ring gear 16 through the shaft 15a and the gear 14. Part of the motive power of the engine 2 is transmitted to the sun gear 10 through the shaft 3. This power is combined with the motive power transmitted to the ring gear 16 by the planetary gear 11 to be output to the intermediate output shaft 8 through the planetary carrier 12. On the other hand, if the shaft 7a of the first pump-motor 7 is coupled to the fifth gear 17 side while the rotating speed of the intermediate output shaft 8 is on the speed-down side, the motive power of the engine 2 is input to the sun gear 10 and then transmitted to the second pump-motor 15 serving as a pump and to the planetary carrier 12 through the ring gear 16. The motive power transmitted to the second pump-motor 15 is then transmitted to the first pump-motor 7 through the hydraulic piping 18. This power joins the power transmitted to the planetary carrier 12 after passing through the synchromesh mechanism 6 and the gear 17 and is then output to the intermediate output shaft 8.

According to the speed-change planetary gear mechanism 9C of the fourth embodiment, output torque can be increased but a large forward/reverse gear shifting section is necessary because the speed reduction ratio is large.

Fifth Embodiment

Figure 11:
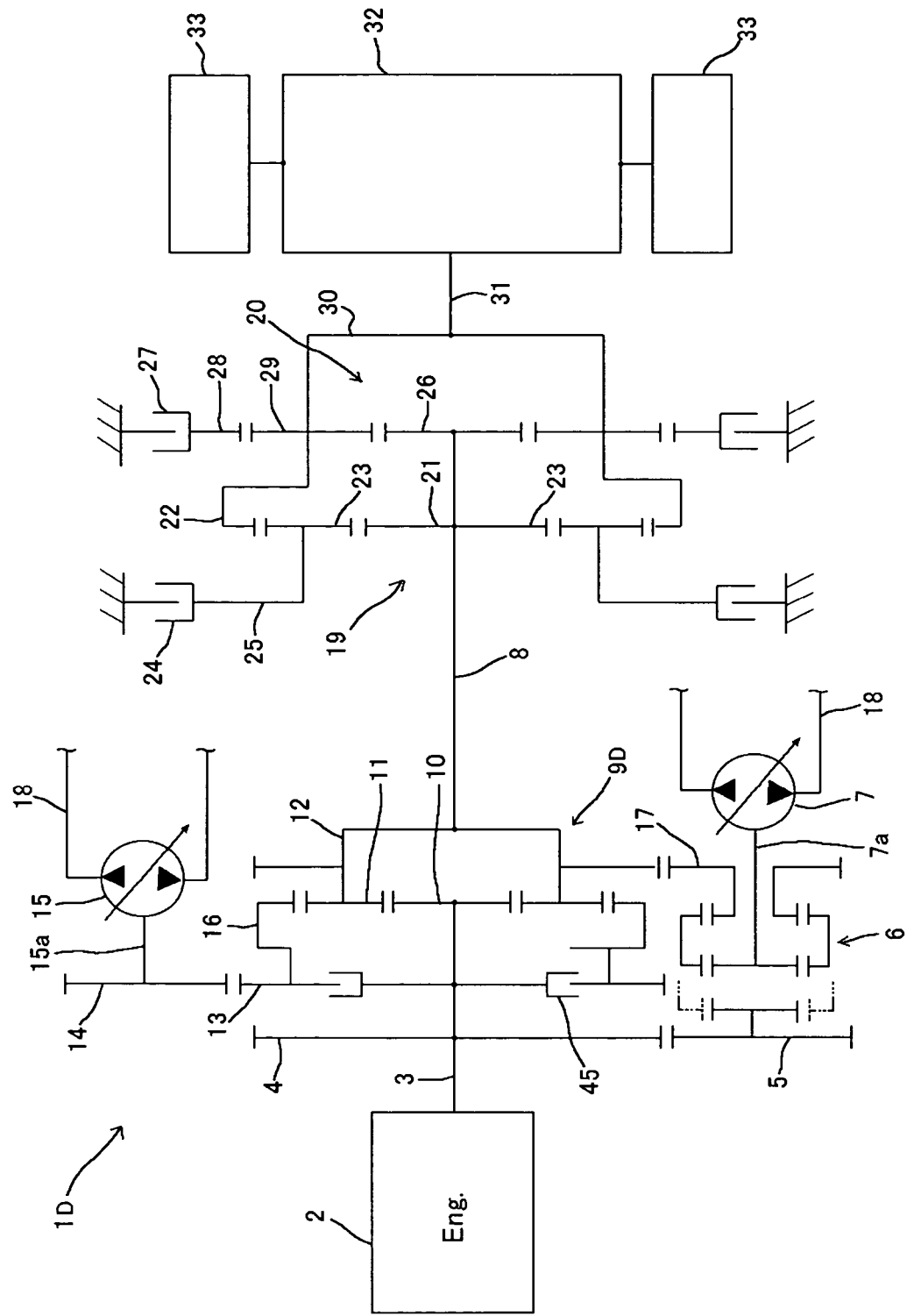
FIG. 11 is a schematic structural diagram of a transmission constructed according to a fifth embodiment of the invention.

FIG. 11 shows a schematic structural diagram of a transmission according to a fifth embodiment of the invention.

A speed-change planetary gear mechanism 9D according to the fifth embodiment is similar to that of the transmission of the fourth embodiment except that a direct-coupling clutch 45 is provided for coupling the third gear 13 and the ring gear 16 to the input shaft 3 (sun gear 10).

The transmission 1D of the fifth embodiment operates similarly to that of the fourth embodiment when the direct-coupling clutch 45 is in a disengaged state. When the direct-coupling clutch 45 is in an engaged state, the sun gear 10 and the ring gear 16 rotate at the same rotating speed, so that the planetary carrier 12 positioned between the sun gear 10 and the ring gear 16 makes only orbital motion, rotating at the same rotating speed as that of the sun gear 10 and the ring gear 16. In this way, the rotary motion of the engine 2 is directly output to the intermediate output shaft 8. At that time, if the hydraulic pump-motors 7, 15 are made to idle away, a transfer of oil pressure between the hydraulic pump-motors 7, 15 does not occur so that only mechanical transmission is carried out.

The speed-change planetary gear mechanism 9D of the fifth embodiment is of the speed reduction type in which the rotating speed of the intermediate output shaft 8 is lower than that of the input shaft 3 in the direct region which brings the second pump-motor 15 to a stop. Apart from the direct region, by connecting the direct-coupling clutch to the speed change planetary gear mechanism 9D, a second direct region may be provided on the higher rotating speed side, the second direction region allowing the rotation of the engine 2 to be transmitted to the intermediate output shaft 8 without reducing the rotating speed of the engine 2. This leads to further increased efficiency.

Sixth Embodiment

Figure 12:
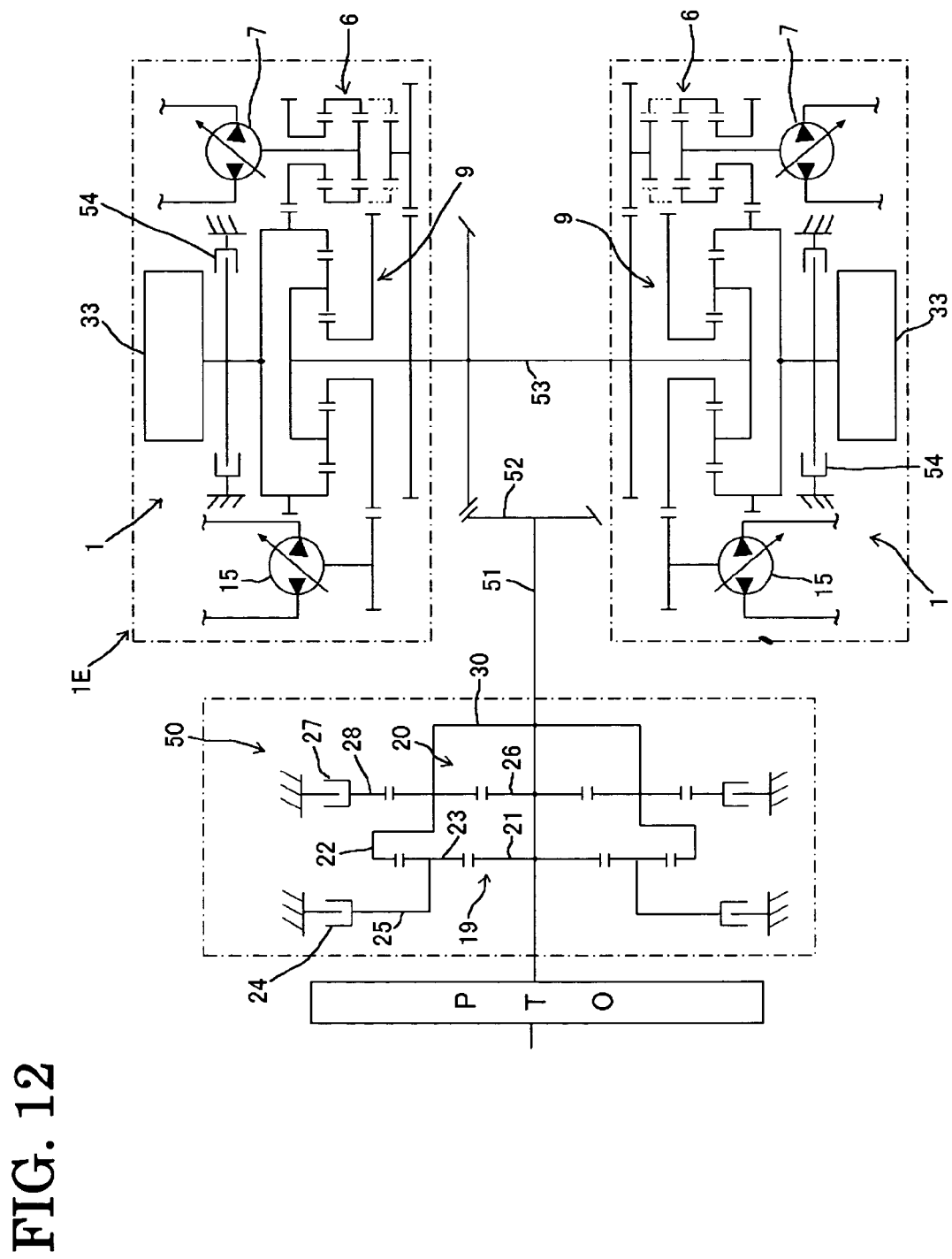
FIG. 12 is a schematic structural diagram of a transmission constructed according to a sixth embodiment of the invention.

FIG. 12 shows a schematic structural diagram of a transmission according to a sixth embodiment of the invention.

A transmission 1E according to the sixth embodiment is formed such that the transmission 1 of the first embodiment is provided for right and left steering sections of a transverse shaft 53 to which motive power is transmitted from an output shaft 51 of a forward/reverse first speed gear shifter 50 through a bevel gear 52. Reference numeral 54 designates a brake system. In the sixth embodiment, the parts corresponding to those of the foregoing embodiments are given the same reference numerals as of the foregoing embodiments.

In the sixth embodiment, the running speeds of the right and left crawler belts are respectively adjusted by differentiating the rotational speeds of the right and left sprockets with the right and left transmissions 1 so that the vehicle body can turn to the right or left. The transmissions provided for the right and left steering sections are not limited to the transmission of the first embodiment but may be any of the transmissions of the second to fifth embodiments (the same applies to each of the following embodiments).

Seventh Embodiment

Figure 13:
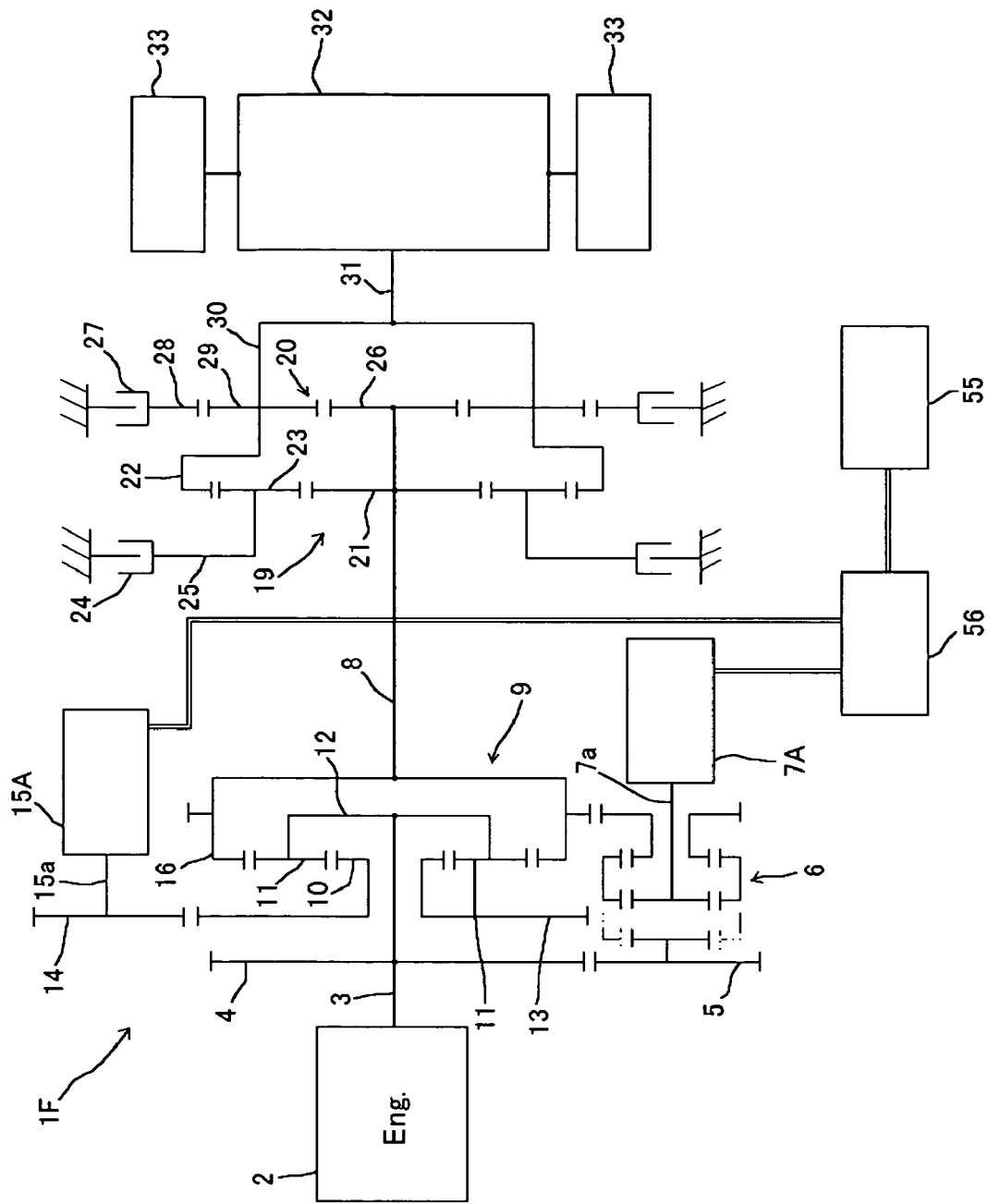
FIG. 13 is a schematic structural diagram of a transmission constructed according to a seventh embodiment of the invention.

FIG. 13 shows a schematic structural diagram of a transmission according to a seventh embodiment of the invention.

The seventh embodiment is associated with one example 1F of electric-mechanical transmissions in which the pump-motors 7, 15 of the first embodiment are replaced with generator-motors 7A, 15A. In this case, each of the generator-motors 7A, 15A is drivingly controlled by an inverter 56 connected to a buttery 55. The electric-mechanical transmission 1F of the seventh embodiment is superior to the hydraulic-mechanical transmissions in terms of efficiency.

Eighth Embodiment

Figure 14:
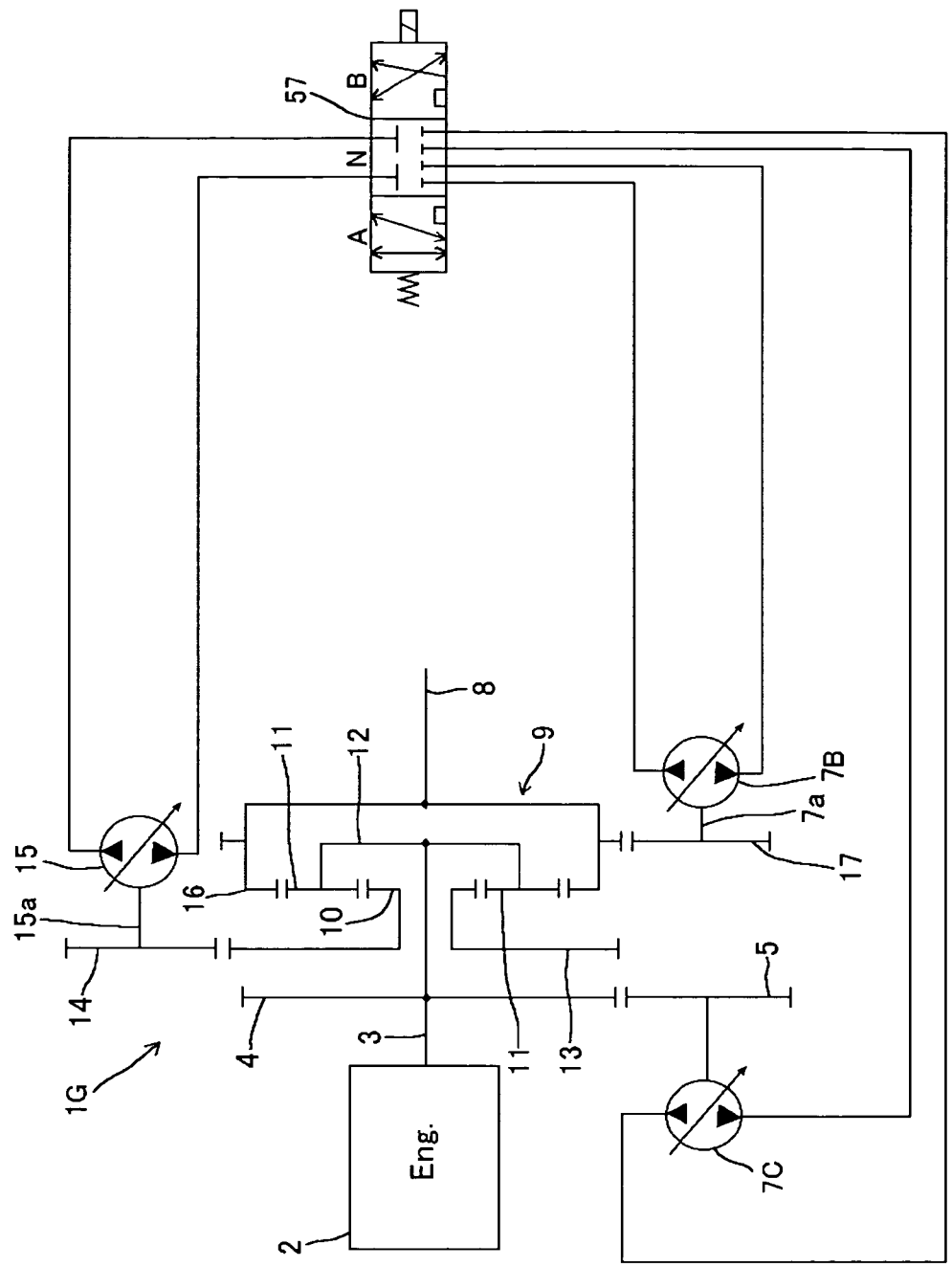
FIG. 14 is a schematic structural diagram of a transmission constructed according to an eighth embodiment of the invention.

FIG. 14 shows a schematic structural diagram of a transmission according to an eighth embodiment of the invention.

The transmission 1G of the eighth embodiment is formed such that the first pump-motor 7 of the first embodiment is divided into two pump-motors 7B, 7C and the connection between these two pump-motors 7B, 7C and the second pump-motor 15 through the hydraulic piping is switched by a three-way selector valve 57. More specifically, if the three-way selector valve 57 is shifted to Position B when the rotating speed of the intermediate output shaft 8 is on the speed-up side, the pump-motor 7C is connected to the second pump-motor 15, serving as a pump, while the second pump-motor 15 serves as a motor. If the three-way selector valve 57 is shifted to Position A when the rotating speed of the intermediate output shaft 8 is on the speed-down side, the pump-motor 7B is connected to the second pump-motor 15, serving as a motor, while the second pump-motor 15 serves as a pump. When the three-way selector valve 57 is in Position N, the discharge pressure of the second pump-motor 15 is blocked by the three-way selector valve 57 so that the rotation of the gear 16 is stopped and the transmission goes into the direct mode.

Ninth Embodiment

Figure 15:
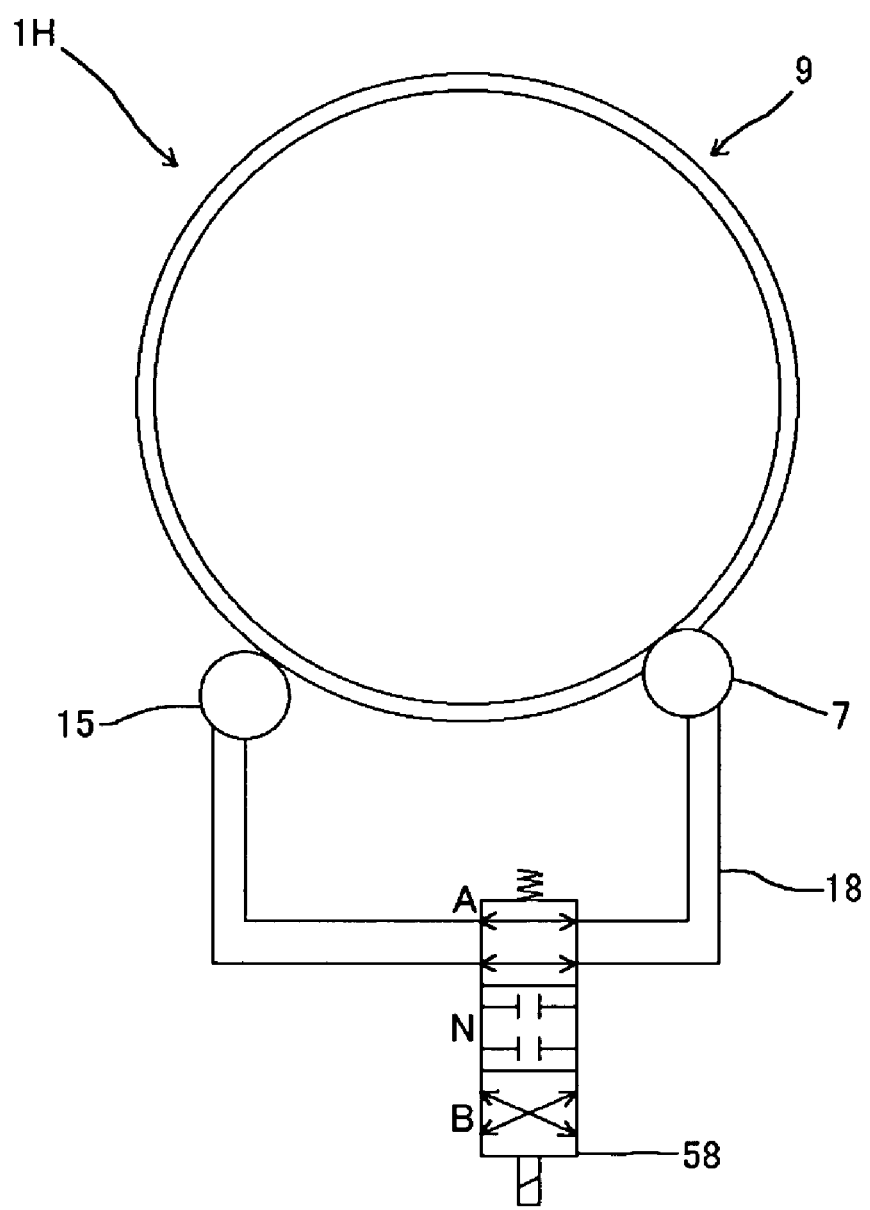
FIG. 15 is a partially schematic structural diagram of a transmission constructed according to a ninth embodiment of the invention.

FIG. 15 shows a schematic structural diagram of a transmission according to a ninth embodiment of the invention.

The transmission 1H of the ninth embodiment is characterized in that a unidirectional rotation type (one-way type) pump-motor is used as the first pump-motor 7. When the first pump/motor 7 is coupled to the input side, it sometimes rotates in a direction opposite to the direction in which it rotates when coupled to the output side. Therefore, ordinary transmissions need to use a bidirectional rotation type (two-way type) pump-motor as the first pump-motor 7. In contrast with this, it is possible for the transmission 1H of the ninth embodiment to have a one-way type pump-motor as the first pump-motor 7 by use of a three-way selector valve 58 which is incorporated in the hydraulic piping 18 for connecting the first pump-motor 7 to the second pump-motor 15 and which is shifted to Position A or Position B in accordance with the switchover of the first pump-motor 7 between the speed-up side and the speed-down side. This leads to cost reduction.

In the ninth embodiment, the first pump-motor 7 and the second pump-motor 15 are hydraulically shut off from each other by shifting the three-way selector valve 58 to Position N so that the same condition as when the mechanical brake 39 is put in operation in the modification of the first embodiment (FIG. 4) can be established. That is, the three-way selector valve 58 functions as a shut-off valve serving as the outflow preventing means described earlier.

Tenth Embodiment

Figure 16:
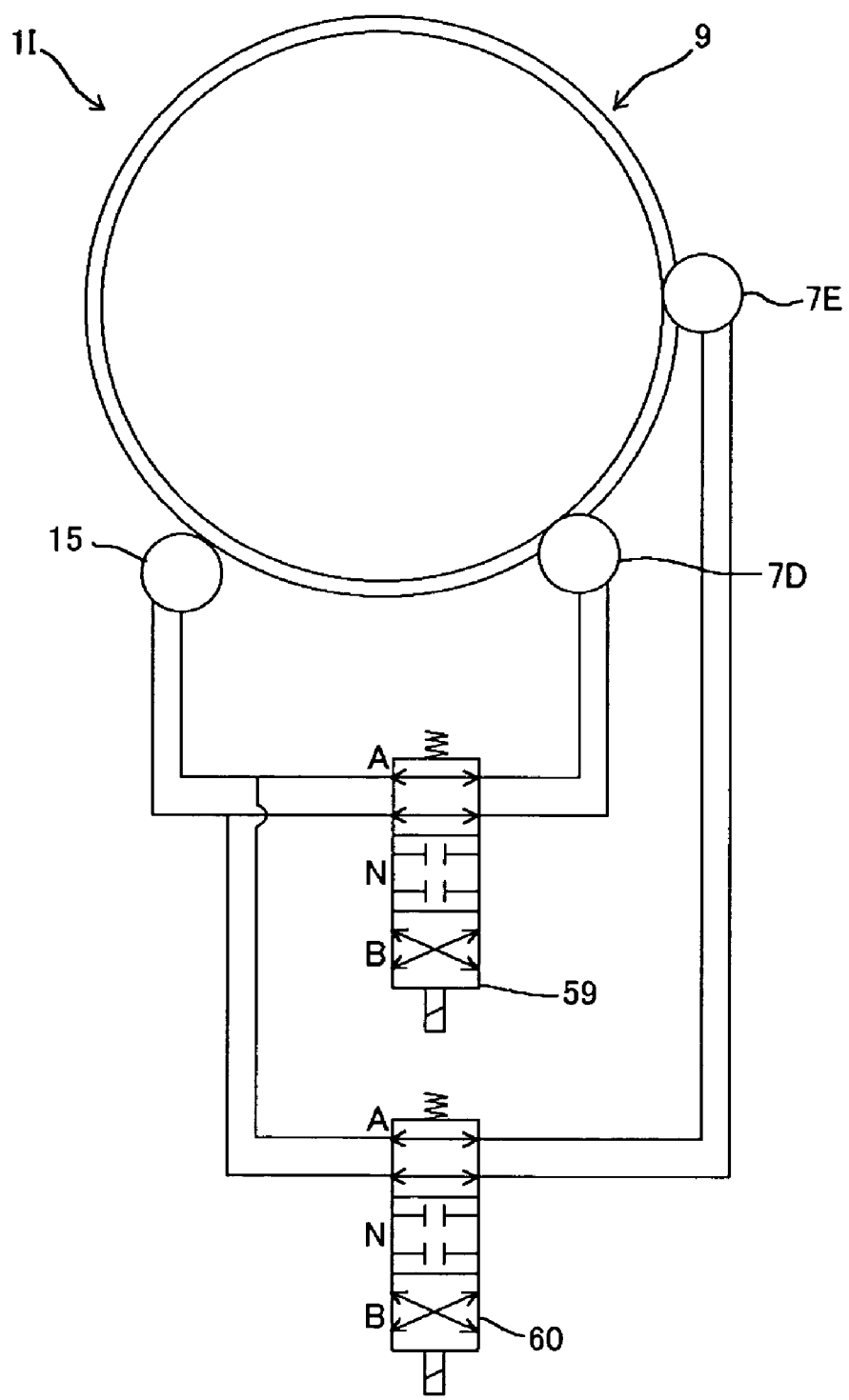
FIG. 16 is a partially schematic structural diagram of a transmission constructed according to a tenth embodiment of the invention.

FIG. 16 shows a schematic structural diagram of a transmission according to a tenth embodiment of the invention.

The transmission 1I of the tenth embodiment is characterized in that the first pump-motor 7 is constituted by two pump-motors 7D and 7E and during small-capacity driving, only one pump-motor 7D or 7E is driven. When the transmission 1I is shifted from the direct mode to the hydraulic-mechanical transmission mode (HMT mode), the capacity of the first pump-motor 7 starts from a value in the vicinity of zero. If a single large-capacity pump-motor is employed as the first pump-motor 7 in this case, the capacity of the pump-motor when the direct mode is switched to the HMT mode is smaller than the maximum capacity of this pump-motor, which results in poor efficiency. This causes a significant drop in the efficiency of the transmission, although the horse power transmitted by the hydraulic mechanism is small. In contrast with this, the transmission 1I of the tenth embodiment overcomes this problem by the following arrangement. The first pump-motor 7 is constituted by two pump-motors 7D, 7E. During small-capacity driving, a three-way selector valve 59 is placed in Position A while a three-way selector valve 60 being placed in Position B, so that only the pump-motor 7D can be brought into operation. During large-capacity driving, the three-way selector valves 59, 60 are both placed in Position A and the two pump-motors 7D, 7E are operated, thereby achieving increased efficiency.

In the tenth embodiment, the speed range covered by the pump-motors 7D, 7E can be changed by altering the speed reduction ratios when the pump-motors 7D, 7E are respectively connected to the planetary gear mechanism 9, so that the capacity of each pump-motor can be reduced. The two pump-motors can take partial charge of the speed range covered by them so that the frequencies of switching between input-split and output-split can be reduced.

While the tenth embodiment has been described in the context of a case where the first pump-motor is constituted by two pump-motors, an alternative is possible according to which the second pump-motor is constituted by two pump motors. The latter case has the same operational effect as described hereinabove.

Eleventh Embodiment

Figure 17:
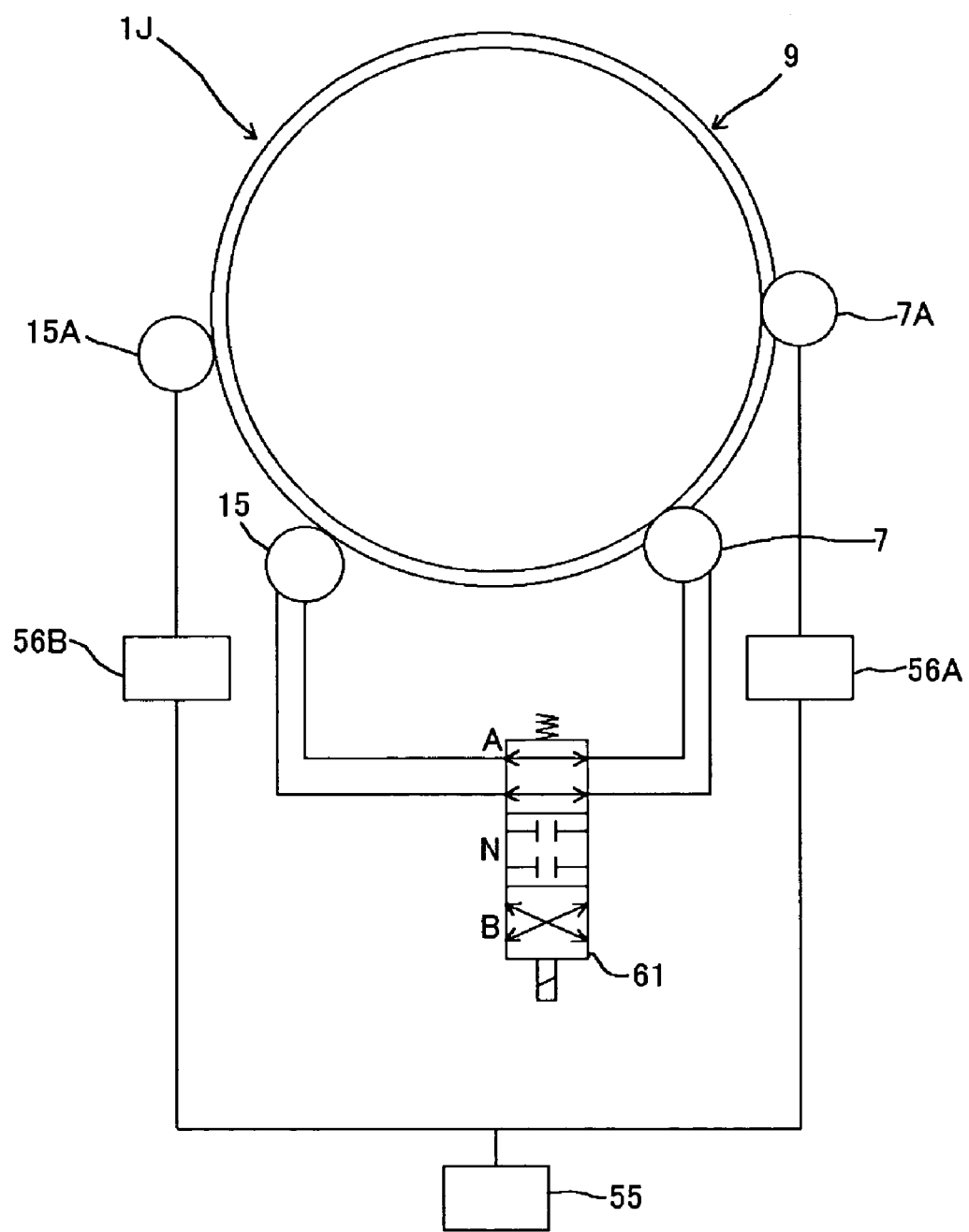
FIG. 17 is a partially schematic structural diagram of a transmission constructed according to an eleventh embodiment of the invention.

FIG. 17 shows a schematic structural diagram of a transmission according to an eleventh embodiment of the invention.

The transmission 1J of the eleventh embodiment is divided into two parts: In one part, two pump-motors 7, 15 are used for hydraulic power transmission and, in the other part, two generator-motors 7A, 15A are used for electric power transmission. The transmission 1J is characterized by the use of these two parts in combination. Hydraulic power transmissions have the advantages of high power density and low cost but are inferior to electric power transmissions in respect of efficiency. Therefore, it is useful to take account of the characteristics of both types and selectively operate these power transmissions by shifting of a three-way selector valve 61 and use of inverters 56A, 56B connected to the buttery 55.

The invention claimed is:

1. A transmission comprising an input shaft, an output shaft, a planetary gear mechanism interposed between the input shaft and the output shaft, a first pump-motor, and a second pump-motor connected to the first pump-motor, the input shaft being coupled to a first element of the planetary gear mechanism, the second pump-motor being coupled to a second element of the planetary gear mechanism, and the output shaft being coupled to a third element of the planetary gear mechanism, the transmission further comprising:

a switching mechanism for selectively coupling the first pump-motor to either the input shaft or the output shaft; and controlling means for controlling the switching mechanism so as to establish, during a switching operation performed by the switching mechanism, a vehicle speed region which brings the rotation of the second pump-motor to be stopped.

2. The transmission according to claim 1, further comprising:

outflow preventing means for preventing an outflow of pressure oil from the second pump-motor during a switching operation performed by the switching mechanism.

3. The transmission according to claim 1, wherein at least one of the first pump-motor and the second pump-motor comprises a plurality of pump-motors.

4. The transmission according to claim 3, wherein at least one of the plurality of pump-motors which comprise at least one of the first and second pump motor is connected to the planetary gear mechanism with a speed reduction ratio different from those of other pump-motors.

5. The transmission according to claim 1, wherein:

the first pump-motor comprises a unidirectional rotation type pump-motor; and a selector valve is provided for switching a flow of pressure oil toward the unidirectional rotation type pump-motor so as to be constantly directed in a specified direction.

6. The transmission according to claim 1, wherein the vehicle speed region which brings the rotation of the second pump-motor to be stopped is no less than a maximum torque point of an engine and no more than a rated torque point of the engine.

7. The transmission according to claim 6, wherein the controlling means controls the switching mechanism such that the first pump-motor is coupled to the output shaft in a vehicle speed region less than the maximum torque point of the engine and is coupled to the input shaft in a vehicle speed region more than the rated torque point of the engine.

8. The transmission according to claim 7, wherein the controlling means controls the switching mechanism according to a rotation signal of an output shaft of the engine and a rotation signal of the output shaft of the transmission.

* * * * *